US012291215B2

(12) United States Patent
Petersen et al.

(10) Patent No.: US 12,291,215 B2
(45) Date of Patent: *May 6, 2025

(54) SYSTEMS AND METHODS FOR DETERMINING AN ESTIMATED WEIGHT OF A VEHICLE

(71) Applicant: Geotab Inc., Oakville (CA)

(72) Inventors: Willem Petersen, Elmira (CA); Harjot Singh Parmar, Kitchener (CA); Muhammad Junaid Gill, Waterdown (CA); Mohammad Salman Sabahi, North York (CA); Daniel J. Lewis, Cambridge (CA); Vinay Kiran Manjunath, Kitchener (CA); Yifeng Ge, North York (CA)

(73) Assignee: Geotab Inc., Oakville, CA (US)

( * ) Notice: Subject to any disclaimer, the term of this patent is extended or adjusted under 35 U.S.C. 154(b) by 372 days.

This patent is subject to a terminal disclaimer.

(21) Appl. No.: 17/979,119

(22) Filed: Nov. 2, 2022

(65) Prior Publication Data
US 2023/0150517 A1 May 18, 2023

Related U.S. Application Data

(63) Continuation-in-part of application No. 17/532,209, filed on Nov. 22, 2021, now Pat. No. 11,525,728.
(Continued)

(51) Int. Cl.
B60W 40/13 (2012.01)
B60W 50/04 (2006.01)
B60W 50/00 (2006.01)

(52) U.S. Cl.
CPC .......... B60W 40/13 (2013.01); B60W 50/045 (2013.01); B60W 2050/0028 (2013.01); B60W 2520/105 (2013.01)

(58) Field of Classification Search
CPC .............. B60W 40/13; B60W 50/045; B60W 2050/0028; B60W 2520/105; G01G 19/08
(Continued)

(56) References Cited

U.S. PATENT DOCUMENTS 6,339,749 B1    1/2002  Rieker
6,446,024 B1    9/2002  Leimbach
(Continued)

FOREIGN PATENT DOCUMENTS

CN    111311782 A    6/2020
CN    112819031 B    6/2022
WO    2009071104 A1  6/2009

OTHER PUBLICATIONS

Phong X. Nguyen, Takayuki Akiyama, Hiroki Ohashi, Masaaki Yamamoto, Akiko Sato, "Vehicle's Weight Estimation Using Smartphone's Acceleration Data to Control Overloading," Jul. 7, 2017, Springer Science+Business Media, LLC 2017, p. 151-162 whole article. (Year: 2017).
(Continued)

Primary Examiner — Ricky Go
(74) Attorney, Agent, or Firm — Lawrence Xin-Tao Yu

(57) ABSTRACT

Systems and methods for determining an estimated weight of a vehicle are provided. The system includes at least one data storage and at least one processor. The at least one data storage is configured to store vehicle data associated with the vehicle. The at least one processor is configured to: identify a plurality of vehicle maneuvers based on the vehicle data, each vehicle maneuver being associated with a portion of the vehicle data, each portion of the vehicle data comprising a measured torque profile; generate a plurality of simulated torque profiles for each vehicle maneuver; generate a plurality of error profiles, an error profile being generated for each vehicle maneuver based on differences between the plurality of simulated torque profiles and the measured torque profile corresponding to that vehicle
(Continued)

maneuver; and determine the estimated weight of the vehicle based on the plurality of error profiles.

21 Claims, 12 Drawing Sheets

Related U.S. Application Data

(60) Provisional application No. 63/279,737, filed on Nov. 16, 2021.

(58) Field of Classification Search
USPC .......................................................... 702/173
See application file for complete search history.

(56) References Cited

U.S. PATENT DOCUMENTS

| | | |
|---|---|---|
| 6,803,530 B2 | 10/2004 | Carlstrom |
| 6,984,192 B2 | 1/2006 | Markyvech |
| 7,039,519 B2 | 5/2006 | Ishiguro et al. |
| 7,363,116 B2 | 4/2008 | Flechtner |
| 7,363,118 B2 | 4/2008 | Jansson |
| 7,395,124 B2 | 7/2008 | Schmidt |
| 7,600,826 B2 * | 10/2009 | Lu ..................... G01G 19/086 303/146 |
| 7,627,440 B2 | 12/2009 | Rehm |
| 7,873,459 B2 | 1/2011 | Fodor |
| 7,979,185 B2 | 7/2011 | Wolfgang et al. |
| 8,096,174 B2 | 1/2012 | Katou |
| 8,182,050 B2 | 5/2012 | Jackson |
| 8,188,385 B2 | 5/2012 | Wolfgang et al. |
| 8,224,549 B2 | 7/2012 | Grubb |
| 8,271,159 B2 | 9/2012 | Kröber |
| 8,386,144 B2 | 2/2013 | Jackson |
| 8,412,447 B2 | 4/2013 | Hecker |
| 8,483,942 B2 | 7/2013 | Watanabe |
| 8,525,656 B2 | 9/2013 | Saito |
| 8,554,511 B2 | 10/2013 | Fujita et al. |
| 8,700,256 B2 | 4/2014 | Duraiswamy et al. |
| 8,718,914 B2 | 5/2014 | Kim et al. |
| 8,768,536 B2 | 7/2014 | Papajewski et al. |
| 8,793,035 B2 | 7/2014 | Yu et al. |
| 8,798,887 B2 | 8/2014 | Nickolaou et al. |
| 8,892,291 B2 | 11/2014 | Nedorezov et al. |
| 8,918,229 B2 | 12/2014 | Hunt et al. |
| 8,954,246 B2 | 2/2015 | Siegel et al. |
| 8,958,940 B2 | 2/2015 | Kawasaki |
| 8,983,752 B2 | 3/2015 | Harvie |
| 9,020,658 B2 | 4/2015 | Karl |
| 9,045,017 B2 | 6/2015 | Buettner |
| 9,120,488 B2 | 9/2015 | Sukaria |
| 9,129,456 B2 | 9/2015 | Keates |
| 9,157,383 B2 | 10/2015 | Stevens |
| 9,157,785 B2 | 10/2015 | Brenninger |
| 9,170,913 B2 | 10/2015 | Hunt |
| 9,187,090 B2 | 11/2015 | Shiozawa |
| 9,194,765 B2 | 11/2015 | Bråthe |
| 9,280,435 B2 | 3/2016 | Hunt |
| 9,290,185 B2 | 3/2016 | Hall |
| 9,310,242 B2 | 4/2016 | Kammann |
| 9,358,846 B2 | 6/2016 | Singh |
| 9,384,111 B2 | 7/2016 | Hunt |
| 9,396,656 B2 | 7/2016 | Cazanas |
| 9,500,514 B2 | 11/2016 | Fredrik |
| 9,563,869 B2 | 2/2017 | McQuade et al. |
| 9,658,099 B2 | 5/2017 | Hammerl |
| 9,663,115 B2 | 5/2017 | Singh |
| 9,725,093 B2 | 8/2017 | Chunodkar |
| 9,752,962 B2 | 9/2017 | Singh |
| 9,760,660 B2 * | 9/2017 | Spira ..................... G06F 30/20 |
| 9,945,302 B2 | 4/2018 | Keates |
| 9,956,965 B1 | 5/2018 | Hall |
| 9,988,057 B2 | 6/2018 | Flaum |
| 9,989,402 B1 | 6/2018 | Pita-Gil |
| 10,017,035 B2 | 7/2018 | Vik |
| 10,053,104 B2 | 8/2018 | Hall |
| 10,060,782 B2 | 8/2018 | Pita-Gil |
| 10,071,742 B2 | 9/2018 | Hall |
| 10,099,575 B2 | 10/2018 | Yamazaki |
| 10,126,160 B2 | 11/2018 | Brierly |
| 10,132,674 B2 | 11/2018 | Watanabe |
| 10,140,618 B2 | 11/2018 | Crawford |
| 10,152,064 B2 | 12/2018 | Switkes |
| 10,174,833 B2 | 1/2019 | Perantoni |
| 10,189,472 B2 | 1/2019 | Kava |
| 10,198,880 B2 | 2/2019 | Willard |
| 10,214,222 B2 | 2/2019 | Hall |
| 10,216,195 B2 | 2/2019 | Switkes |
| 10,234,871 B2 | 3/2019 | Klaus |
| 10,377,379 B2 | 8/2019 | Lacaze |
| 10,399,597 B2 | 9/2019 | Varunjikar |
| 10,408,668 B2 | 9/2019 | Park |
| 10,480,989 B2 | 11/2019 | Strak |
| 10,507,820 B2 | 12/2019 | Hawley |
| 10,543,846 B2 | 1/2020 | Hall |
| 10,570,839 B2 | 2/2020 | Szwabowski |
| 10,589,700 B2 | 3/2020 | Niedert |
| 10,612,961 B2 | 4/2020 | Huang |
| 10,641,646 B2 | 5/2020 | Holden |
| 10,739,788 B2 | 8/2020 | Switkes |
| 10,740,766 B2 | 8/2020 | Crawford |
| 10,830,294 B2 | 11/2020 | Kim |
| 10,933,824 B2 | 3/2021 | Niedert |
| 11,021,161 B2 | 6/2021 | Sbogård |
| 11,035,461 B2 | 6/2021 | Kim |
| 11,106,220 B2 | 8/2021 | Switkes |
| 11,110,956 B2 | 9/2021 | George |
| 11,161,515 B1 | 11/2021 | Kang |
| 11,186,286 B2 | 11/2021 | Yi |
| 11,203,271 B2 | 12/2021 | Cha |
| 11,298,991 B2 | 4/2022 | Singh |
| 11,307,081 B2 | 4/2022 | Di Domenico |
| 11,485,371 B2 | 11/2022 | Owen |
| 11,519,776 B2 | 12/2022 | Davis |
| 11,536,579 B2 | 12/2022 | Garbelli |
| 11,573,119 B2 | 2/2023 | Huang et al. |
| 2010/0305822 A1 | 12/2010 | Kresse |
| 2011/0066322 A1 | 3/2011 | Karlsson |
| 2012/0158260 A1 | 6/2012 | Fujii |
| 2013/0073127 A1 | 3/2013 | Kumar |
| 2014/0278041 A1 | 9/2014 | Brenninger |
| 2015/0057951 A1 * | 2/2015 | Stalnaker ............... G06F 30/15 703/2 |
| 2015/0330317 A1 * | 11/2015 | Lee ..................... F02D 29/02 701/102 |
| 2017/0342920 A1 | 11/2017 | Pirjaberi |
| 2018/0128672 A1 | 5/2018 | Park |
| 2018/0194413 A1 | 7/2018 | Maurer |
| 2019/0318051 A1 | 10/2019 | Oswald |
| 2020/0232842 A1 | 7/2020 | Huang |
| 2020/0317212 A1 | 10/2020 | Rogness |
| 2021/0163018 A1 | 6/2021 | Oh |
| 2021/0178849 A1 | 6/2021 | Park |
| 2021/0201034 A1 | 7/2021 | Izawa et al. |
| 2021/0239515 A1 | 8/2021 | Valdemarsson |
| 2022/0041172 A1 | 2/2022 | Jundt |
| 2022/0144289 A1 | 5/2022 | Rezaeian |
| 2022/0155130 A1 | 5/2022 | Laine |
| 2022/0176832 A1 | 6/2022 | Espig |
| 2022/0242391 A1 | 8/2022 | Mathews, Jr. |
| 2022/0363270 A1 | 11/2022 | Abdollahpouri |
| 2022/0381570 A1 | 12/2022 | Cui |
| 2023/0035599 A1 | 2/2023 | Pettersson |

OTHER PUBLICATIONS

Extended European Search Report dated May 4, 2023 for Application No. 22205714.3.
Extended European Search Report dated May 4, 2023 for Application No. 22206523.7.

* cited by examiner

SYSTEMS AND METHODS FOR DETERMINING AN ESTIMATED WEIGHT OF A VEHICLE

CROSS-REFERENCE TO RELATED APPLICATIONS

This application is a continuation-in-part of U.S. patent application Ser. No. 17/532,209 filed Nov. 22, 2021 and titled "SYSTEMS AND METHODS FOR DETERMINING AN ESTIMATED WEIGHT OF A VEHICLE", which claims priority to U.S. Provisional Patent Application No. 63/279,737 filed Nov. 16, 2021 and titled "SYSTEMS AND METHODS FOR DETERMINING AN ESTIMATED WEIGHT OF A VEHICLE", the contents of which are incorporated herein by reference for all purposes.

FIELD

The embodiments described herein generally relate to weight estimation, and in particular, to determining an estimated weight of a vehicle.

BACKGROUND

The following is not an admission that anything discussed below is part of the prior art or part of the common general knowledge of a person skilled in the art.

Knowledge regarding the weight of a vehicle can be useful for a variety of reasons. For example, the weight of a vehicle can affect whether the vehicle is subject to certain regulatory restrictions. Commercial motor vehicles are often subject to regulatory requirements that depend on their load. For instance, commercial motor vehicles may be restricted from carrying loads beyond certain weight limits to prevent overloading. Similarly, commercial motor vehicles may be prohibited from traveling in certain geographical areas based on their weight. Commercial motor vehicles may also be required to meet a particular fuel economy that can be affected by their load. Knowing the weight of a vehicle can be useful to ensure compliance with regulatory requirements. However, it can be difficult to measure the weight of a vehicle.

One way of measuring for the weight of a vehicle is using an external weighing device, such as a truck scale or weighbridge. However, these devices are not always available and cannot measure the weight of a vehicle during operation (e.g., when the vehicle is in transport). Another method of measuring the weight of a vehicle is using load sensors installed in the vehicle. However, installing load sensors into commercial motor vehicles can be difficult, expensive, and inaccurate.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with a broad aspect, there is provided a system for determining an estimated weight of a vehicle. The system includes at least one data storage and at least one processor. The at least one data storage is configured to store vehicle data associated with the vehicle. The vehicle data includes a plurality of vehicle parameters collected during operation of the vehicle. The at least one processor is in communication with the at least one data storage. The at least one processor configured to: identify a plurality of vehicle maneuvers based on the vehicle data, each vehicle maneuver being associated with a portion of the vehicle data, each portion of the vehicle data including a measured torque profile; generate a plurality of simulated torque profiles for each vehicle maneuver, each simulated torque profile being generated using a vehicle dynamics model based on at least some of the portion of the vehicle data associated with the corresponding vehicle maneuver and a candidate vehicle weight; generate a plurality of error profiles, an error profile being generated for each vehicle maneuver based on differences between the plurality of simulated torque profiles and the measured torque profile corresponding to that vehicle maneuver; and determine the estimated weight of the vehicle based on the plurality of error profiles.

In some embodiments, each portion of the vehicle data associated with one of the plurality of vehicle maneuvers may include a measured speed profile.

In some embodiments, each simulated torque profile may be generated using the vehicle dynamics model based on the measured speed profile associated with the corresponding vehicle maneuver and the candidate vehicle weight.

In some embodiments, the error profile for each vehicle maneuver may be generated based on differences between an area under a curve of each of the plurality of simulated torque profiles and an area under a curve of the measured torque profile corresponding to that vehicle maneuver.

In some embodiments, determining the estimated weight of the vehicle may involve minimizing the plurality of error profiles.

In some embodiments, determining the estimated weight of the vehicle may involve identifying a plurality of candidate vehicle weights, a candidate vehicle weight being identified for each error profile, each candidate vehicle weight minimizing the corresponding error profile.

In some embodiments, determining the estimated weight of the vehicle may involve determining the estimated weight of the vehicle based on an average of the identified candidate vehicle weights that minimize the corresponding error profiles.

In some embodiments, the average of the identified candidate vehicle weights may be a weighted average; and the identified candidate vehicle weights may be weighted based on a sensitivity of the corresponding error profiles.

In some embodiments, the sensitivity of each error profile may correspond to a slope of that error profile.

In some embodiments, the at least one processor may be further configured to: determine a load state of the vehicle based on the estimated weight of the vehicle.

In some embodiments, determining the load state of the vehicle may involve: determining the vehicle is in a loaded state if the estimated weight of the vehicle satisfies a predetermined vehicle weight threshold; and determining the vehicle is in an unloaded state if the estimated weight of the vehicle does not satisfy the predetermined vehicle weight threshold.

In some embodiments, the predetermined vehicle weight threshold may be a first predetermined vehicle weight threshold; and determining the load state of the vehicle may involve determining the vehicle is in an overloaded state if the estimated weight of the vehicle satisfies a second predetermined vehicle weight threshold.

In some embodiments, the at least one processor may be further configured to: determine a fuel economy of the vehicle based on the estimated weight of the vehicle.

In some embodiments, each plurality of simulated torque profiles may correspond to a plurality of candidate vehicle weights; and within each plurality of simulated torque profiles, each simulated torque profile may correspond to a different one of the candidate vehicle weights in the plurality of candidate vehicle weights.

In some embodiments, identifying the plurality of vehicle maneuvers may involve: identifying portions of the vehicle data that meet at least one predetermined vehicle condition associated with the vehicle dynamics model.

In some embodiments, the at least one predetermined vehicle condition may include propulsion of the vehicle.

In some embodiments, the at least one predetermined vehicle condition may include non-turning of the vehicle.

In some embodiments, the at least one predetermined vehicle condition may include non-braking of the vehicle.

In some embodiments, the at least one predetermined vehicle condition may include changes in vehicle elevation being less than a predetermined elevation change threshold.

In some embodiments, the at least one processor may be remotely located from the vehicle.

In accordance with a broad aspect, there is provided a method for determining an estimated weight of a vehicle. The method involves operating at least one processor to: receive vehicle data associated with the vehicle, the vehicle data including a plurality of vehicle parameters collected during operation of the vehicle; identify a plurality of vehicle maneuvers based on the vehicle data, each vehicle maneuver being associated with a portion of the vehicle data, each portion of the vehicle data including a measured torque profile; generate a plurality of simulated torque profiles for each vehicle maneuver, each simulated torque profile being generated using a vehicle dynamics model based on at least some of the portion of the vehicle data associated with the corresponding vehicle maneuver and a candidate vehicle weight; generate a plurality of error profiles, an error profile being generated for each vehicle maneuver based on differences between the plurality of simulated torque profiles and the measured torque profile corresponding to that vehicle maneuver; and determine the estimated weight of the vehicle based on the plurality of error profiles.

In some embodiments, each portion of the vehicle data associated with one of the plurality of vehicle maneuvers may include a measured speed profile.

In some embodiments, each simulated torque profile may be generated using the vehicle dynamics model based on the measured speed profile associated with the corresponding vehicle maneuver and the candidate vehicle weight.

In some embodiments, the error profile for each vehicle maneuver may be generated based on differences between an area under a curve of each of the plurality of simulated torque profiles and an area under a curve of the measured torque profile corresponding to that vehicle maneuver.

In some embodiments, determining the estimated weight of the vehicle may involve minimizing the plurality of error profiles.

In some embodiments, determining the estimated weight of the vehicle may involve identifying a plurality of candidate vehicle weights, a candidate vehicle weight being identified for each error profile, each candidate vehicle weight minimizing the corresponding error profile.

In some embodiments, determining the estimated weight of the vehicle may involve determining the estimated weight of the vehicle based on an average of the identified candidate vehicle weights that minimize the corresponding error profiles.

In some embodiments, the average of the identified candidate vehicle weights may be a weighted average; and the identified candidate vehicle weights may be weighted based on a sensitivity of the corresponding error profiles.

In some embodiments, the sensitivity of each error profile may correspond to a slope of that error profile.

In some embodiments, the method may further involve operating the at least one processor to: determine a load state of the vehicle based on the estimated weight of the vehicle.

In some embodiments, determining the load state of the vehicle may involve: determining the vehicle is in a loaded state if the estimated weight of the vehicle satisfies a predetermined vehicle weight threshold; and determining the vehicle is in an unloaded state if the estimated weight of the vehicle does not satisfy the predetermined vehicle weight threshold.

In some embodiments, the predetermined vehicle weight threshold may be a first predetermined vehicle weight threshold; and determining the load state of the vehicle may involve determining the vehicle is in an overloaded state if the estimated weight of the vehicle satisfies a second predetermined vehicle weight threshold.

In some embodiments, the method may further involve operating the at least one processor to: determine a fuel economy of the vehicle based on the estimated weight of the vehicle.

In some embodiments, each plurality of simulated torque profiles may correspond to a plurality of candidate vehicle weights; and within each plurality of simulated torque profiles, each simulated torque profile may correspond to a different one of the candidate vehicle weights in the plurality of candidate vehicle weights.

In some embodiments, identifying the plurality of vehicle maneuvers may involve: identifying portions of the vehicle data that meet at least one predetermined vehicle condition associated with the vehicle dynamics model.

In some embodiments, the at least one predetermined vehicle condition may include propulsion of the vehicle.

In some embodiments, the at least one predetermined vehicle condition may include non-turning of the vehicle.

In some embodiments, the at least one predetermined vehicle condition may include non-braking of the vehicle.

In some embodiments, the at least one predetermined vehicle condition may include changes in vehicle elevation being less than a predetermined elevation change threshold.

In some embodiments, the at least one processor may be remotely located from the vehicle.

In accordance with a broad aspect, there is provided a method for determining an estimated weight of a vehicle, the method involves operating at least one processor to: receive vehicle data associated with the vehicle, the vehicle data including a plurality of vehicle parameters collected during operation of the vehicle; identify a plurality of vehicle maneuvers based on the vehicle data, each vehicle maneuver being associated with a portion of the vehicle data, each portion of the vehicle data including a measured torque profile; identify a previous comparable vehicle maneuver for each vehicle maneuver; receive a plurality of simulated torque profiles for each previous comparable vehicle maneuver; generate a plurality of error profiles, an error profile being generated for each vehicle maneuver based on differences between the plurality of simulated torque profiles and the measured torque profile corresponding to that vehicle maneuver; and determine the estimated weight of the vehicle by minimizing the plurality of error profiles.

In some embodiments, each portion of the vehicle data associated with one of the plurality of vehicle maneuvers can include an identifying profile; and identifying the previous comparable vehicle maneuver for each vehicle maneuver can involve: comparing the identifying profile associated with the vehicle maneuver with a plurality of previous representative identifying profiles associated with a plurality of previous representative vehicle maneuvers.

In some embodiments, comparing the identifying profile with the plurality of previous representative identifying profiles can involve: determining a similarity score between the identifying profile and each previous representative identifying profile.

In some embodiments, determining the similarity score between the identifying profile and each previous representative identifying profile can involve using a dynamic time warping algorithm to determine a cumulative distance between the identifying profile and each previous representative identifying profile.

In some embodiments, the identifying profile can include an acceleration profile and the plurality of previous representative identifying profiles can include a plurality of previous representative acceleration profiles.

In some embodiments, the identifying profile can include an elevation profile and the plurality of previous representative identifying profiles can include a plurality of previous representative elevation profiles.

In some embodiments, determining the estimated weight of the vehicle can involve identifying a plurality of candidate vehicle weights, a candidate vehicle weight being identified for each error profile, each candidate vehicle weight minimizing the corresponding error profile.

In some embodiments, determining the estimated weight of the vehicle can involve determining the estimated weight of the vehicle based on an average of the identified candidate vehicle weights that minimize the corresponding error profiles.

In some embodiments, the average of the identified candidate vehicle weights can be a weighted average; and the identified candidate vehicle weights can be weighted based on a sensitivity of the corresponding error profiles.

In some embodiments, identifying the plurality of vehicle maneuvers can involve: identifying portions of the vehicle data that meet at least one predetermined vehicle condition associated with a vehicle dynamics model used to generate the plurality of simulated torque profiles.

In accordance with a broad aspect, there is provided a system for determining an estimated weight of a vehicle, the system including: at least one data storage configured to store vehicle data associated with the vehicle, the vehicle data including a plurality of vehicle parameters collected during operation of the vehicle; and at least one processor in communication with the at least one data storage, the at least one processor configured to: identify a plurality of vehicle maneuvers based on the vehicle data, each vehicle maneuver being associated with a portion of the vehicle data, each portion of the vehicle data including a measured torque profile; identify a previous comparable vehicle maneuver for each vehicle maneuver; receive a plurality of simulated torque profiles for each previous comparable vehicle maneuver; generate a plurality of error profiles, an error profile being generated for each vehicle maneuver based on differences between the plurality of simulated torque profiles and the measured torque profile corresponding to that vehicle maneuver; and determine the estimated weight of the vehicle by minimizing the plurality of error profiles.

In some embodiments, each portion of the vehicle data associated with one of the plurality of vehicle maneuvers can include an identifying profile; and identifying the previous comparable vehicle maneuver for each vehicle maneuver can involve: comparing the identifying profile associated with the vehicle maneuver with a plurality of previous representative identifying profiles associated with a plurality of previous representative vehicle maneuvers.

In some embodiments, comparing the identifying profile with the plurality of previous representative identifying profiles can involve: determining a similarity score between the identifying profile and each previous representative identifying profile.

In some embodiments, determining the similarity score between the identifying profile and each previous representative identifying profile can involve using a dynamic time warping algorithm to determine a cumulative distance between the identifying profile and each previous representative identifying profile.

In some embodiments, the identifying profile can include an acceleration profile and the plurality of previous representative identifying profiles can include a plurality of previous representative acceleration profiles.

In some embodiments, the identifying profile can include an elevation profile and the plurality of previous representative identifying profiles can include a plurality of previous representative elevation profiles.

In some embodiments, determining the estimated weight of the vehicle can involve identifying a plurality of candidate vehicle weights, a candidate vehicle weight being identified for each error profile, each candidate vehicle weight minimizing the corresponding error profile.

In some embodiments, determining the estimated weight of the vehicle can involve determining the estimated weight of the vehicle based on an average of the identified candidate vehicle weights that minimize the corresponding error profiles.

In some embodiments, the average of the identified candidate vehicle weights can be a weighted average; and the identified candidate vehicle weights can be weighted based on a sensitivity of the corresponding error profiles.

In some embodiments, identifying the plurality of vehicle maneuvers can involve: identifying portions of the vehicle data that meet at least one predetermined vehicle condition associated with a vehicle dynamics model used to generate the plurality of simulated torque profiles.

In accordance with a broad aspect, there is provided a method for preprocessing vehicle weight estimations, the method involving operating at least one processor to: receive vehicle data associated with a plurality of vehicles, the vehicle data including a plurality of vehicle parameters collected during operation of the plurality of vehicles; identify a plurality of vehicle maneuvers based on the vehicle data, each vehicle maneuver being associated with a portion of the vehicle data, each portion of the vehicle data including an identifying profile; identify a plurality of representative vehicle maneuvers from the plurality of vehicle maneuvers based on the identifying profile associated with each vehicle maneuver; generate a plurality of simulated torque profiles for each representative vehicle maneuver, each simulated torque profile being generated using a vehicle dynamics model based on at least some of the portion of the vehicle data associated with the corresponding representative vehicle maneuver and a candidate vehicle weight; and store each plurality of simulated torque profiles in association with the identifying profile for each representative vehicle maneuver.

In some embodiments, identifying the plurality of representative vehicle maneuvers from the plurality of vehicle maneuvers can involve: comparing each identifying profile with each other identifying profile.

In some embodiments, comparing the identifying profile with the plurality of previous representative identifying profiles can involve: determining a similarity score between each identifying profile; and eliminating at least some of the vehicle maneuvers from being identified as representative vehicle maneuvers based on the similarity score between each identifying profile.

In some embodiments, determining the similarity score between each identifying profile can involve using a dynamic time warping algorithm to determine a cumulative distance between each identifying profile.

In some embodiments, the identifying profile can include an acceleration profile.

In some embodiments, the identifying profile can include an elevation profile.

In some embodiments, each portion of the vehicle data associated with one of the plurality of vehicle maneuvers can include a measured speed profile.

In some embodiments, each simulated torque profile can be generated using the vehicle dynamics model based on the measured speed profile associated with the corresponding vehicle maneuver and the candidate vehicle weight.

In some embodiments, identifying the plurality of vehicle maneuvers can involve: identifying portions of the vehicle data that meet at least one predetermined vehicle condition associated with the vehicle dynamics model.

In some embodiments, the at least one predetermined vehicle condition can include acceleration of the vehicle and changes in the elevation of the vehicle satisfying a predetermined threshold.

In accordance with a broad aspect, there is provided a system for preprocessing vehicle weight estimations, the system includes: at least one data storage configured to store vehicle data associated with a plurality of vehicles, the vehicle data including a plurality of vehicle parameters collected during operation of the plurality of vehicles; and at least one processor in communication with the at least one data storage, the at least one processor configured to: identify a plurality of vehicle maneuvers based on the vehicle data, each vehicle maneuver being associated with a portion of the vehicle data, each portion of the vehicle data including an identifying profile; identify a plurality of representative vehicle maneuvers from the plurality of vehicle maneuvers based on the identifying profile associated with each vehicle maneuver; generate a plurality of simulated torque profiles for each representative vehicle maneuver, each simulated torque profile being generated using a vehicle dynamics model based on at least some of the portion of the vehicle data associated with the corresponding representative vehicle maneuver and a candidate vehicle weight; and store each plurality of simulated torque profiles in association with the identifying profile for each representative vehicle maneuver.

In some embodiments, identifying the plurality of representative vehicle maneuvers from the plurality of vehicle maneuvers can involve: comparing each identifying profile with each other identifying profile.

In some embodiments, comparing the identifying profile with the plurality of previous representative identifying profiles can involve: determining a similarity score between each identifying profile; and eliminating at least some of the vehicle maneuvers from being identified as representative vehicle maneuvers based on the similarity score between each identifying profile.

In some embodiments, determining the similarity score between each identifying profile can involve using a dynamic time warping algorithm to determine a cumulative distance between each identifying profile.

In some embodiments, the identifying profile can include an acceleration profile.

In some embodiments, the identifying profile can include an elevation profile.

In some embodiments, each portion of the vehicle data associated with one of the plurality of vehicle maneuvers can include a measured speed profile.

In some embodiments, each simulated torque profile can be generated using the vehicle dynamics model based on the measured speed profile associated with the corresponding vehicle maneuver and the candidate vehicle weight.

In some embodiments, identifying the plurality of vehicle maneuvers can involve identifying portions of the vehicle data that meet at least one predetermined vehicle condition associated with the vehicle dynamics model.

In some embodiments, the at least one predetermined vehicle condition can include acceleration of the vehicle and changes in the elevation of the vehicle satisfying a predetermined threshold.

In accordance with a broad aspect, there is provided a non-transitory computer readable medium having instructions stored thereon executable by at least one processor to implement any of the methods described herein.

BRIEF DESCRIPTION OF THE DRAWINGS

Several embodiments will be described in detail with reference to the drawings, in which.

Figure 1:
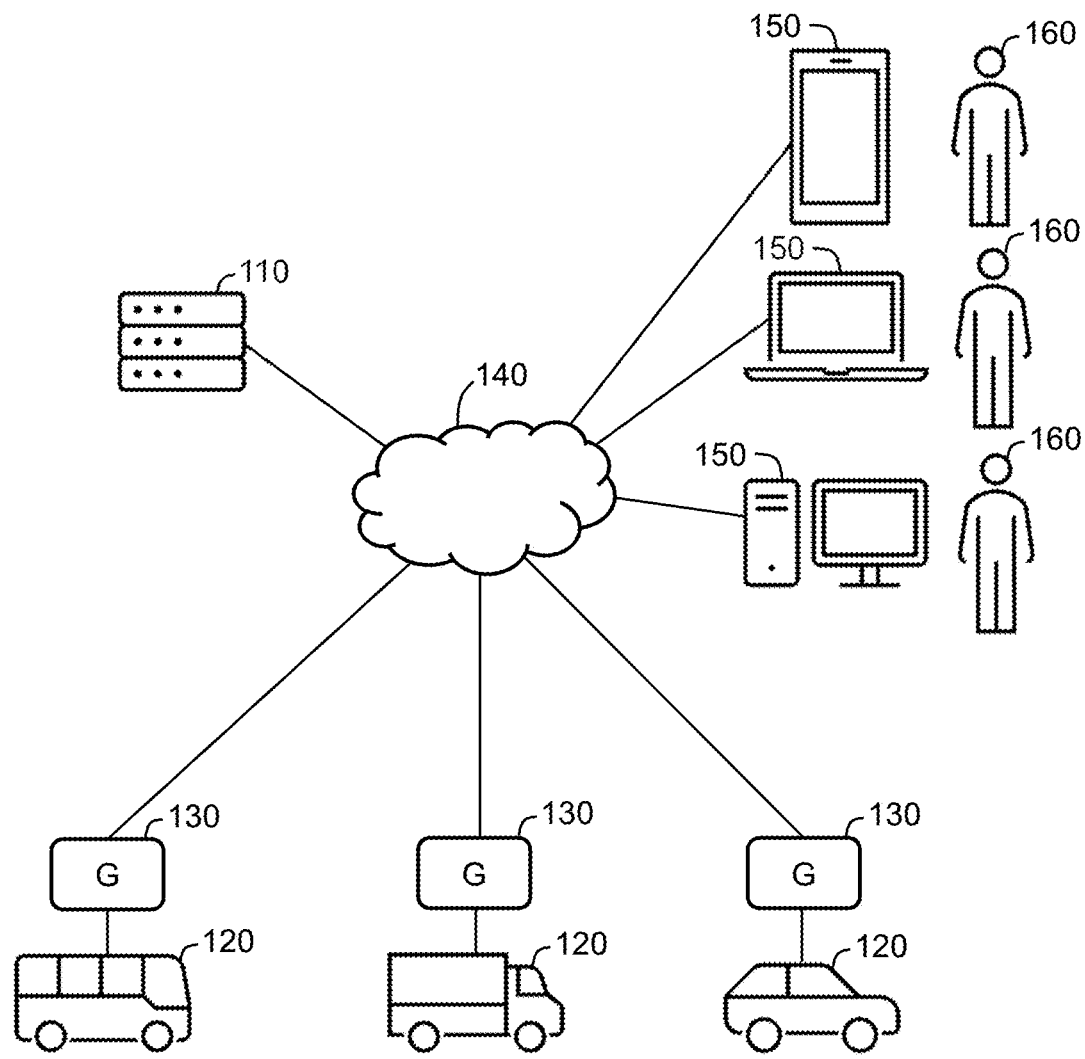
FIG. 1 is a block diagram of various components interacting with an example fleet management system and a plurality of telematic devices, in accordance with an embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DETAILED DESCRIPTION

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Referring to FIG. 1, there is shown an example fleet management system 110 for managing a plurality of vehicles 120 equipped with a plurality of telematics devices 130. In operation, the telematics devices 130 can collect various data associated with the vehicles 120 (i.e., vehicle data) and share the vehicle data with the fleet management system 110. The fleet management system 110 can be remotely located from the telematic devices 130 and the vehicles 120.

The vehicles 120 may include any machines for transporting goods or people. For example, the vehicles 120 can include motor vehicles, such as, but not limited to, motorcycles, cars, trucks, and/or buses. The motor vehicles can be gas, diesel, electric, hybrid, and/or alternative fuel. In some cases, the vehicles 120 may include other kinds of vehicles, such as, but not limited to, railed vehicles (e.g., trains, trams), watercraft (e.g., ships, boats), aircraft (e.g., airplanes, helicopters), and/or spacecraft. Each vehicle 120 can be equipped with a telematics device 130.

The telematics devices 130 can be standalone devices that are removably installed in the vehicles 120. Alternatively, the telematics devices 130 can be integrated components that are integral with the vehicles 120. The telematics devices 130 can collect various vehicle data and share the vehicle data with the fleet management system 110. The vehicle data may include any information, parameters, attributes, characteristics, and/or features associated with the vehicles 120. For example, the vehicle data can include, but is not limited to, location data, speed data, acceleration data, engine data, fluid level data (e.g., oil, coolant, and/or washer fluid), and/or energy level data (e.g., battery and/or fuel level).

The fleet management system 110 can process the vehicle data collected from the telematics devices 130 to provide various analysis and reporting. For example, the fleet management system 110 can process the vehicle data to gain additional information regarding the vehicles 120, such as, but not limited to, trip distances/times, idling times, harsh braking/driving, usage rate, and/or fuel economy. Various data analytics and machine learning techniques may be used by the fleet management system 110 to process the vehicle data. The vehicle data can then be used to manage various aspects of the vehicles 120, such as, but not limited to, route planning, vehicle maintenance, driver compliance, asset utilization, and/or fuel management. In this manner, the fleet management system 110 can improve the productivity, efficiency, safety, and/or sustainability of the vehicles 120.

A plurality of computing devices 150 can provide access to the fleet management system 110 to a plurality of users 160. For example, the users 160 may use the computing devices 150 to retrieve various vehicle data collected and/or processed by the fleet management system 110. The computing devices 150 can be any computers or computer systems, such as, but not limited to, personal computers, portable computers, wearable computers, workstations, desktops, laptops, smartphones, tablets, smartwatches, PDAs (personal digital assistants), and/or mobile devices. The computing devices 150 can be remotely located from the fleet management system 110, telematic devices 130 and vehicles 120.

The fleet management system 110, telematics devices 130, and computing devices 150 can communicate through a network 140. The network 140 may include more than one network. The network 140 may be wireless, wired, or a combination thereof. The network 140 may employ any communication protocol and utilize any communication medium. For example, the network 140 may include, but is not limited to, Wi-Fi™ networks, Ethernet networks, Bluetooth™ networks, NFC (near-field communication) networks, radio networks, cellular networks, and/or satellite networks. The network 140 may be private, public, or a combination thereof. For example, the network 140 may include, but is not limited to, LANs (local area networks), WANs (wide area networks), and/or the Internet. The network 140 may also facilitate communication with other devices and systems that are not shown.

Figure 2:
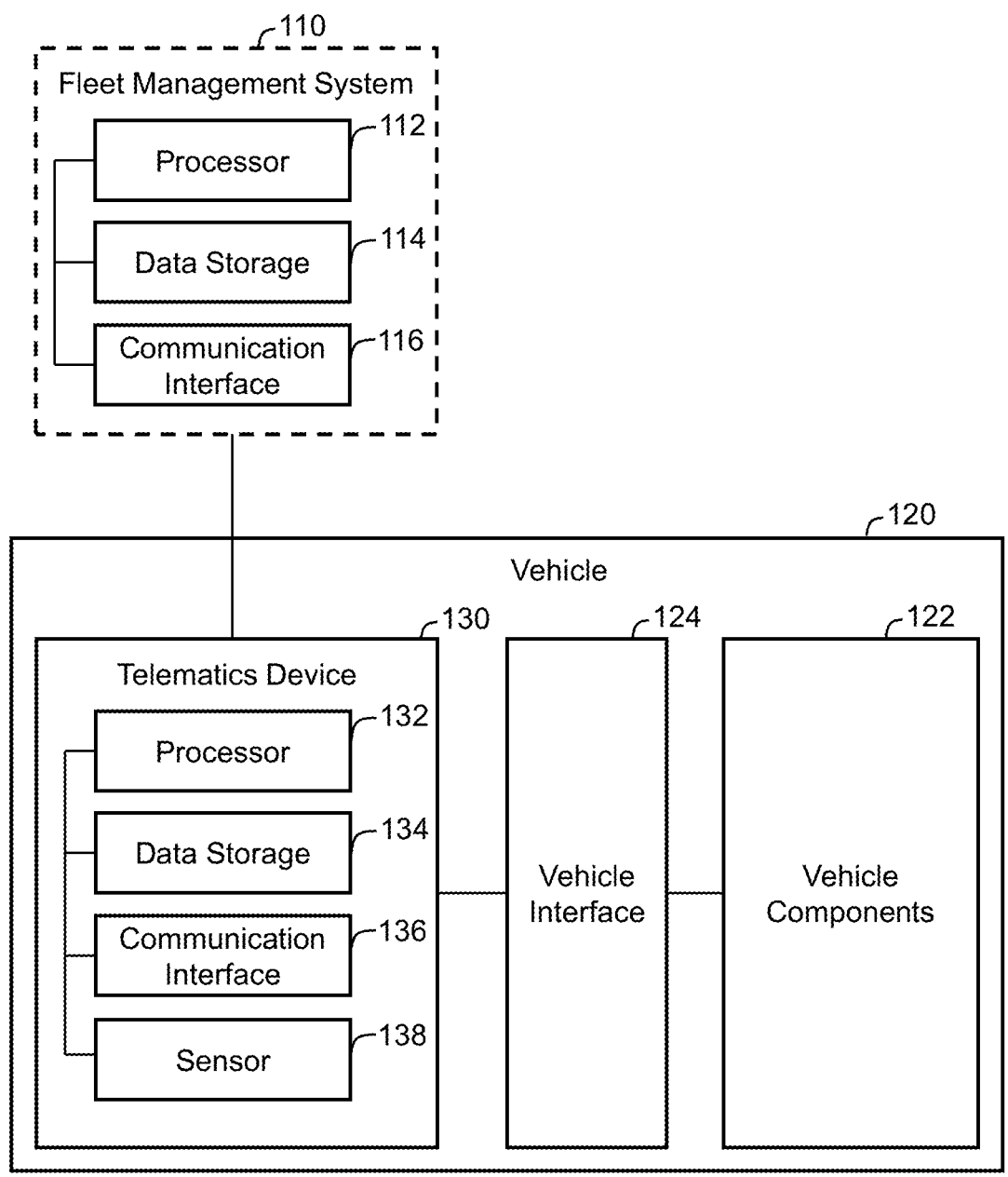
FIG. 2 is a block diagram of the fleet management system shown in FIG. 1 interacting with one of the telematics devices and vehicles shown in FIG. 1, in accordance with an embodiment.

Reference will now be made to FIG. 2 to further explain the operation of the fleet management system 110, telematics devices 130, and vehicles 120. In the illustrated example, the fleet management system 110 in communication with a telematics device 130 that is installed in a vehicle 120. As shown, the fleet management system 110 can include a processor 112, a data storage 114, and a communication interface 116. Each of these components can communicate with each other. Each of these components may be combined into fewer components or divided into additional subcomponents. Two or more of these components and/or subcomponents may be distributed across a wide geographical area. The fleet management system 110 can be implemented using one or more computers or computer systems. For example, the fleet management system 110 may be implemented using one or more servers. The one or more servers can be distributed across a wide geographical area. In some embodiments, the fleet management system 110 may be implemented using a cloud computing platform.

The processor 112 can control the operation of the fleet management system 110. The processor 112 can be implemented using any suitable processing devices or systems, such as, but not limited to, CPUs (central processing units), GPUs (graphics processing units), FPGAs, (field programmable gate arrays), ASICs (application specific integrated circuits), DSPs (digital signal processors), NPUs (neural processing units), QPUs (quantum processing units), microprocessors, and/or controllers. The processor 112 can execute various instructions, programs, and/or software stored on the data storage 114 to implement various methods described herein. For example, the processor 112 can process various vehicle data collected by the fleet management system 110 from the telematics devices 130.

The data storage 114 can store various data for the fleet management system 110. The data storage 114 can be implemented using any suitable data storage devices or systems, such as, but not limited to, RAM (random access memory), ROM (read only memory), flash memory, HDD (hard disk drives), SSD (solid-state drives), magnetic tape drives, optical disc drives, and/or memory cards. The data storage 114 may include volatile memory, non-volatile memory, or a combination thereof. The data storage 114 may include non-transitory computer readable media. The data storage 114 can store various instructions, programs, and/or software that can be executed by the processor 112 to implement various methods described herein. The data storage 114 may store various vehicle data collected from the telematics devices 130 and/or processed by the processor 112.

The communication interface 116 can enable communication between the fleet management system 110 and other devices or systems, such as the telematics device 130. The communication interface 116 can be implemented using any suitable communication devices or systems. For example, the communication interface 116 may include various physical connectors, ports, or terminals, such as, but not limited to, USB (universal serial bus), Ethernet, Thunderbolt, Firewire, SATA (serial advanced technology attachment), PCI (peripheral component interconnect), HDMI (high-definition multimedia interface), and/or DisplayPort. The communication interface 116 can also include various wireless interface components to connect to wireless networks, such as, but not limited to, Wi-Fi™, Bluetooth™, NFC, cellular, and/or satellite. The communication interface 116 can enable various inputs and outputs to be received at and sent from the fleet management system 110. For example, the communication interface 116 may be used to retrieve vehicle data from the telematics device 130.

The telematics device 130 also can include a processor 132, a data storage 134, and a communication interface 136. Additionally, the telematics device 130 can include a sensor 138. Each of these components can communicate with each other. Each of these components may be combined into fewer components or divided into additional subcomponents.

The processor 132 can control the operation of the telematics device 130. Like the processor 112 of the fleet management system 110, the processor 132 of the telematics device 130 can be implemented using any suitable processing devices or systems. The processor 132 can execute various instructions, programs, and/or software stored on the data storage 134 to implement various methods described herein. For example, the processor 132 can process various vehicle data collected from the vehicle components 142 or the sensor 138.

The data storage 134 can store various data for the telematics device 130. Like the data storage 114 of the fleet management system 110, the data storage 134 of the telematics device 130 can be implemented using any suitable data storage devices or systems. The data storage 134 can store various instructions, programs, and/or software that can be executed by the processor 132 to implement various methods described herein. The data storage 134 can also store various vehicle data collected from the vehicle components 142 or the sensor 138.

The communication interface 136 can enable communication between the telematics device 130 and other devices or systems, such as the fleet management system 110 and vehicle components 142. Like the communication interface 116 of the fleet management system 110, the communication interface 136 of the telematics device 130 can be implemented using any suitable communication devices or systems. The communication interface 116 can enable various inputs and outputs to be received at and sent from the telematics device 130. For example, the communication interface 116 may be used collect vehicle data from the vehicle components 142 and sensor 138 and/or to send vehicle data to the fleet management system 110.

The sensor 138 can detect and/or measure various environmental events and/or changes. The sensor 138 can include any suitable sensing devices or systems, including, but not limited to, location sensors, velocity sensors, acceleration sensors, orientation sensors, vibration sensors, proximity sensors, temperature sensors, humidity sensors, pressure sensors, optical sensors, and/or audio sensors. When the telematics device 130 is installed in the vehicle 120, the sensor 138 can be used to collect vehicle data that may not be obtainable from the vehicle components 142. For example, the sensor 138 may include a satellite navigation device, such as, but not limited to, a GPS (global positioning system) receiver, which can measure the location of the vehicle 120. Additionally, or alternatively, the sensor 138 may include accelerometers, gyroscopes, magnetometers, and/or IMUs (inertial measurement units), which can measure the acceleration and/or orientation of the vehicle 120.

The telematics device 130 can be installed within the vehicle 120, removably or integrally. The vehicle 120 can include vehicle components 122 and a vehicle interface 124. Each of these components may be combined into fewer components or divided into additional subcomponents.

The vehicle components 122 can include any subsystems, parts, and/or subcomponents of the vehicle 120. The vehicle components 122 can be used to operate and control the vehicle 120. For example, the vehicle components 122 can include, but are not limited to, powertrains, engines, transmissions, steering, braking, seating, batteries, doors, and/or suspensions. The telematics device 130 can collect various vehicle data from the vehicle components 122. For example, the telematics device 130 may communicate with one or more ECUs (electronic control units) that control the vehicle components 142 and/or one or more internal vehicle sensors.

The vehicle interface 124 can facilitate communication between the vehicle components 122 and other devices or systems. The vehicle interface 124 can include any suitable communication devices or systems. For example, the vehicle interface 124 may include, but is not limited to, an ODB-II (on-board diagnostics) port and/or CAN bus (controller area network) port. The vehicle interface 124 can be used by the telematics device 130 to collect vehicle data from the vehicle components 122. For example, the communication interface 136 of the telematics device 130 can be connected to the vehicle interface 124 to communicate with the vehicle components 122.

Figure 3:
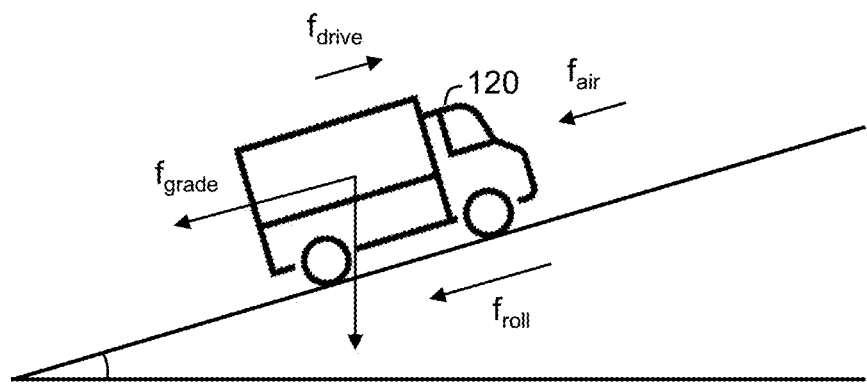
FIG. 3 is a free body diagram of one of the vehicles shown in FIG. 1, in accordance with an embodiment.

Referring to FIG. 3, there is shown a free body diagram of a vehicle 120. As shown, the vehicle 120 can be subject to various forces, including, but not limited to, a drive force ($f_{drive}$), a grade resistance ($f_{grade}$), a rolling resistance ($f_{roll}$), and an air resistance ($f_{air}$). The drive force can represent the propulsion of the vehicle 120, the grade resistance can represent the gravitational effect of the incline of the driving surface, the roll resistance can represent the friction of the driving surface, and the air resistance can represent the drag or friction of the air surrounding the vehicle 120. One way of determining an estimated weight of the vehicle 120 is an inductive approach by observing the forces applied to the vehicle 120. The inductive approach can involve measuring, estimating, and/or calculating the net force ($f_{net}$) acting on the vehicle 120 and the acceleration (a) of the vehicle 120. For example, the estimated weight (m) of the vehicle 120 can be determined using the following equation:

$$m = f_{net}/a$$

The net force ($f_{net}$) acting on the vehicle 120 can be determined using the following equation:

$$f_{net} = f_{drive} - f_{grade} - f_{roll} - f_{air}$$

One disadvantage of this approach is that it can be difficult to measure, estimate, and/or calculate the forces acting on the vehicle 120. Inaccuracies in determining the forces acting on the vehicle 120 can lead to significant weight estimation errors. For example, it may be difficult to directly measure the grade resistance ($f_{grade}$), during operation of the vehicle 120. However, estimating and/or calculating the rolling resistance ($f_{grade}$) may also be difficult because it may depend on various dynamic factors related to the driving surface, such as, but not limited to, material, temperature, moisture, etc. It may not be possible to accurately account for all of these factors at various points during a trip.

Figure 4:
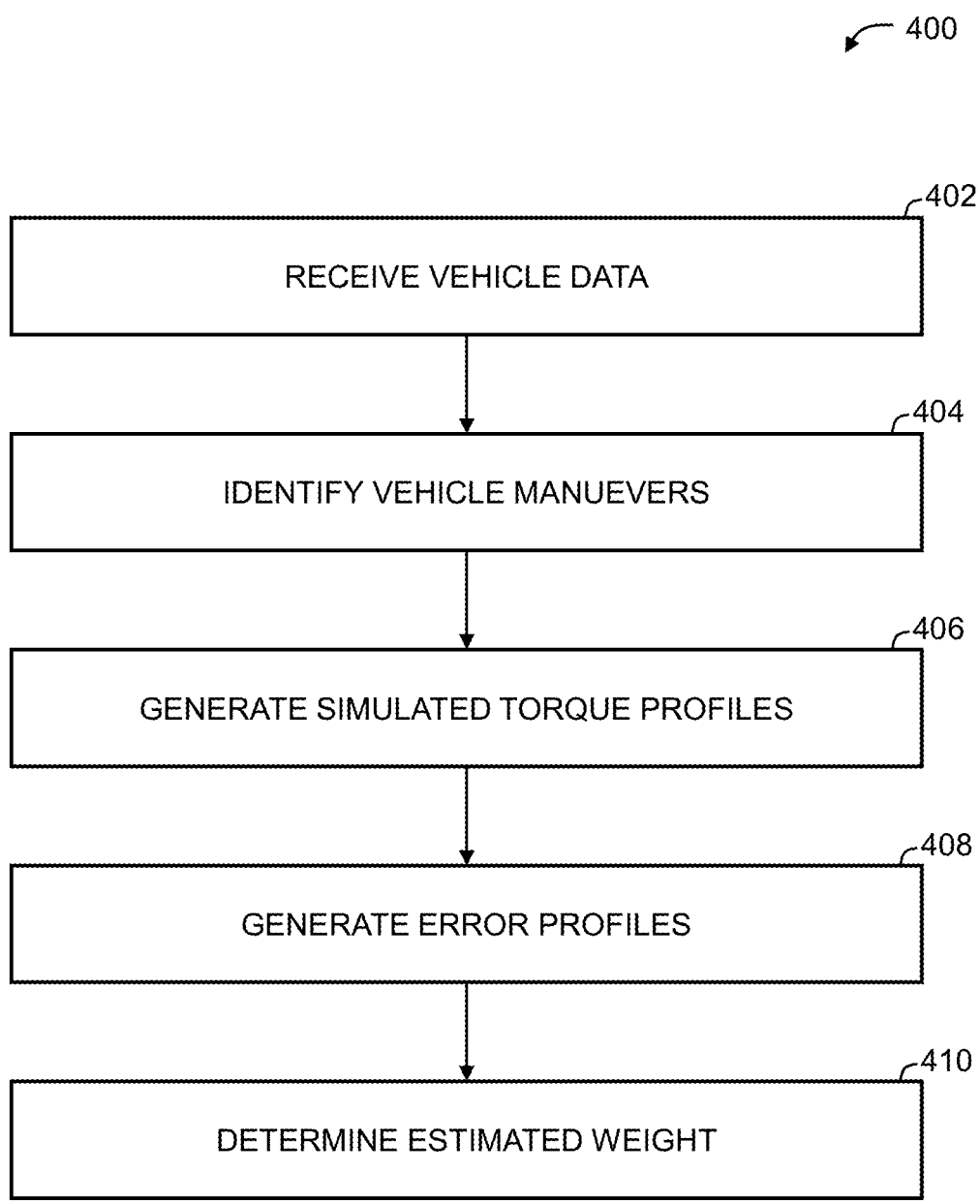
FIG. 4 is a flowchart of an example method for determining an estimated weight of a vehicle, in accordance with an embodiment.

Referring to FIG. 4, there is shown an example method 400 for determining an estimated weight of a vehicle 120. In contrast with the deductive approach described with reference to FIG. 3, method 400 can use an inductive approach based on a vehicle dynamics model. The vehicle dynamics model can be used to simulate various aspects of the vehicle 120, instead of directly measuring, estimating, and/or calculating them. An advantage of this approach is that method 400 can use vehicle data that is readily available throughout a trip (e.g., from telematics device 130) to dynamically generate weight estimates corresponding to various points during the trip.

Method 400 can be implemented by the fleet management system 110, one or more telematics devices 130, or a combination thereof. That is, method 400 can be implemented by operating at least one processor of the fleet management system 110 and/or one or more telematics devices 130. For example, method 400 can be implemented by the processor 112 and/or the processor 132 executing instructions stored on the data storage 114 and/or the data storage 134. An advantage of executing one or more steps of method 400 at the fleet management system 110 (i.e., remote from the telematics device 130 and vehicle 120) is that less data processing may be completed at the telematics devices 130. Hence, the hardware complexity and cost of the telematics devices 130 can be reduced. Furthermore, it may be easier to update and/or modify software running on the fleet management system 110 as compared to a telematics device 130 that has already been installed in a vehicle 120. An advantage of executing one or more steps of method 400 at the telematics device 130 (i.e., remote from the fleet management system 110) is that less data may be transmitted to the fleet management system 110. Hence, network usage and bandwidth on the network 140 can be reduced. This may reduce usage costs associated with the network 140.

At 402, vehicle data associated with the vehicle 120 can be received. For example, the telematics device 130 may receive vehicle data from the sensor 138 and/or vehicle components 122. Alternatively, or additionally, the fleet management system 110 may receive vehicle data from a telematics device 130. Alternatively, or additionally, the processor 112 and/or processor 132 may receive vehicle data from the data storage 114 and/or data storage 134.

The vehicle data can include a plurality of vehicle parameters collected during operation of the vehicle 120. As described herein, the vehicle data may include any information, parameters, attributes, characteristics, and/or features associated with the vehicles 120. The vehicle data may vary depending on the vehicle dynamics model used by the method 400.

Figure 5:
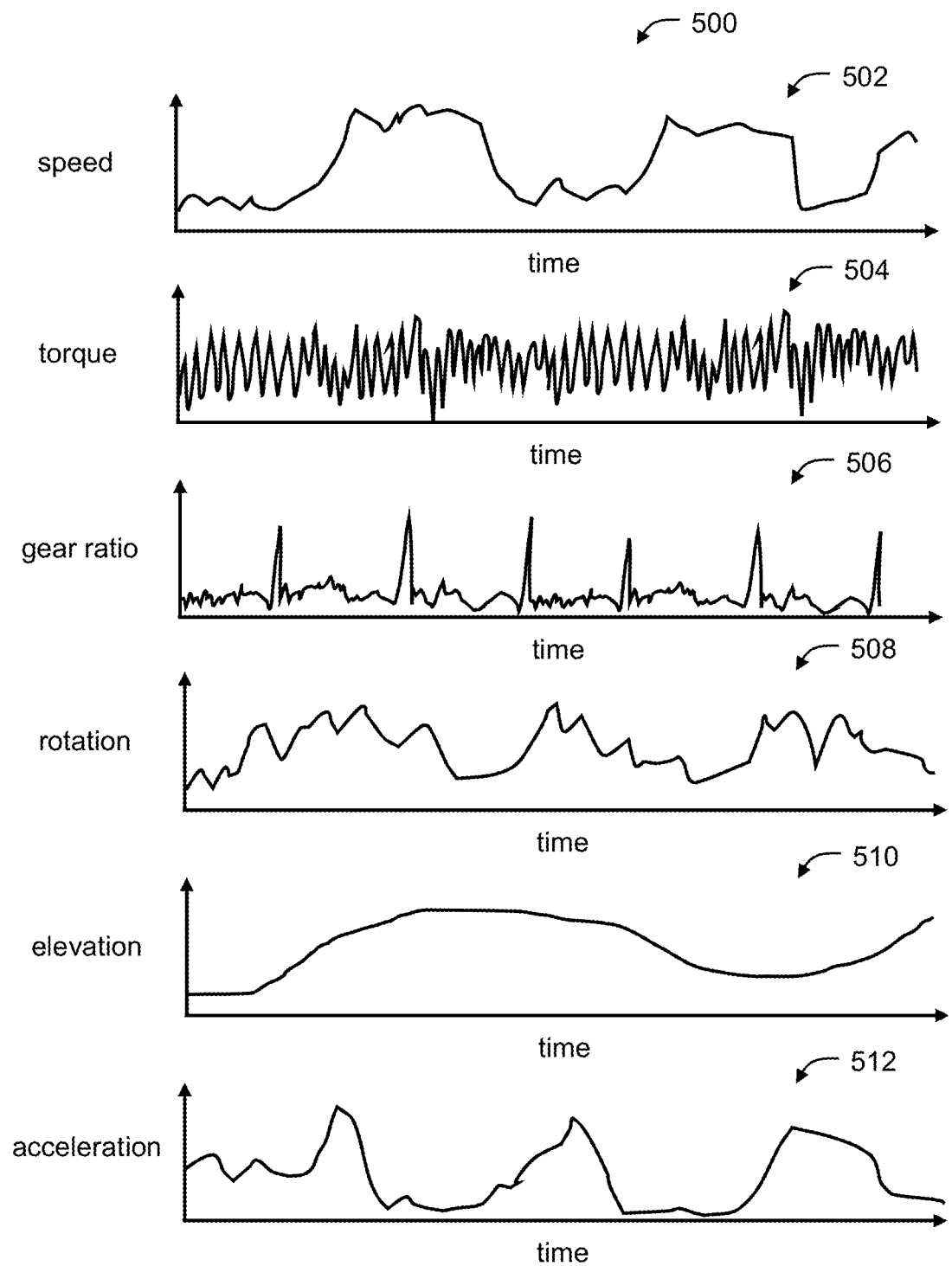
FIG. 5 is a plurality of graphs of example vehicle data, in accordance with an embodiment.

Referring now to FIG. 5, there is shown example vehicle data 500. As shown, the vehicle data 500 can include various time series of data points corresponding to various vehicle parameters. Each data point can represent the value of a particular vehicle parameter at a given time. In the illustrated example, the vehicle data 500 includes speed data 502, torque data 504, gear ratio data 506, rotation data 508, elevation data 510, and acceleration data 512.

The speed data 502 can represent the velocity, or rate of locational change of the vehicle 120. The speed data can be obtained from a VSS (vehicle speed sensor), for example, located in the powertrain and/or ABS (anti-lock braking system) of the vehicle 120. Alternatively, or additionally, the speed data can be calculated based on changes in location data over time, for example, obtained from sensor 138.

The torque data 504 can represent the torque, or twisting/rotational force output by the vehicle 120. The torque data 504 can be in units of torque and/or a percentage of maximum torque. The torque data 504 can include engine torque data, representing the torque output at the engine of the vehicle 120, and/or wheel torque data, representing the torque output at the wheel of the vehicle 120. The engine torque data can be obtained from the engine of the vehicle 120, for example, from an internal sensor and/or ECU. The wheel torque data can be calculated based on the engine torque data and the gear ratio data 506. For example, the wheel torque can be determined based on the following equation:

$$\text{wheel torque} = \text{effective gear ratio} \times \text{engine torque}$$

The rotational data 508 can represent the rotational speed, or rpm (revolutions per minute) generated by the vehicle 120. The rotational data 508 can include engine rotational data, representing the rpm of the engine of the vehicle 120, and/or wheel rotational data, representing the rpm of the wheels of the vehicle 120. The engine rotational data can be obtained from a crankshaft position sensor of the vehicle 120. The wheel rotational data can be obtained based on the speed data 502 and the circumference of the wheels. For example, the wheel rotational data can be determined using the following equation:

$$\text{wheel } RPM = \frac{\text{vehicle speed}}{\text{wheel circumference}}$$

The gear ratio data 506 can represent the effective gear ratio, or ratio between the rate of rotation output at the engine and at the wheels of the vehicle 120. The gear ratio data 506 can be calculated based on the rotational data 508 of the vehicle. For example, the effective gear ratio can be determined using the following equation:

$$\text{effective gear ratio} = \frac{\text{engine } rpm}{\text{wheel } rpm}$$

Alternatively, the gear ratio data 506 can be calculated based on the transmission ratio ($i_e$) and differential ratio ($i_d$) of the vehicle 120. For example, the effective gear ratio can be determined using the following equation:

$$\text{effective gear ratio} = i_e i_d$$

The elevation data 510 can indicate the altitude, or distance above sea level of the vehicle 120. The elevation data 510 can be calculated based on location data, for example, obtained from the sensor 138. For example, the elevation data 510 can be determined by correlating the location data with topographic data. Alternatively, the elevation data 510 can be obtained from an altimeter of the telematic device 130 (e.g., sensor 138) or vehicle 120.

The acceleration data 512 can indicate the acceleration, or the rate of change of the speed of the vehicle 120. The acceleration data can be obtained from an accelerometer of the telematic device 130 (e.g., sensor 138), or vehicle 120. Alternatively, the acceleration data 512 can be calculated based on the speed data 502. For example, the acceleration can be determined using the following equation (where $v_2$ is the velocity of the vehicle at time $t_2$, and $v_1$ is the velocity of the vehicle at time $t_1$):

$$\text{acceleration} = \frac{v_2 - v_1}{t_2 - t_1}$$

In some embodiments, the vehicle data 500 can be preprocessed prior to and/or subsequent to being received. For example, the vehicle data 500 may be received in various formats, standards, and/or protocols. The vehicle data 500 can be reformatted prior to being used for weight estimation. For instance, the vehicle data 500 may include data points that correspond to irregular and/or mismatched points in time. The vehicle data 500 can be interpolated so that the data points in each time series correspond to successive and/or equally spaced points in time.

Referring back to FIG. 4, at 404, a plurality of vehicle maneuvers can be identified. For example, the fleet management system 110 (e.g., processor 112) and/or telematics device 130 (e.g., processor 132) can identify the vehicle maneuvers. Each vehicle maneuver can be associated with a portion of the vehicle data 500. For example, a vehicle maneuver may be associated with a portion of the speed data 502, torque data 504, gear ratio data 506, rotation data 508, elevation data 510, and/or acceleration data 512. A portion of the vehicle data 500 corresponding to a vehicle maneuver can be referred to as a profile. For example, a portion of the speed data 502 associated with a vehicle maneuver may be referred to as a measured speed profile. Similarly, a portion of the torque data 504 associated with a vehicle maneuver may be referred to as a measured torque profile. In some embodiments, each vehicle maneuver may be associated with a portion of the vehicle data 500 that includes a measured torque profile. In some embodiments, each vehicle maneuver may be associated with a portion of the vehicle data that includes a measured speed profile.

The plurality of vehicle maneuvers can be identified based on the vehicle data 500. The criteria used to identify the vehicle maneuvers and portions of the vehicle data 500 can depend on the vehicle dynamics model used by method 400. The vehicle maneuvers may be identified by identifying portions of the vehicle data 500 that satisfy one or more predetermined conditions associated with the vehicle dynamics model. The predetermined conditions may be related to underlying assumptions, rules, and/or requirements of the vehicle dynamics model. For example, the predetermined conditions may include the propulsion of the vehicle 120. That is, the vehicle 120 is in acceleration and is being actively propelled or driven. The predetermined conditions may also include non-turning of the vehicle 120. That is, the vehicle 120 is traveling in substantially straight trajectory, without turning. The predetermined conditions may also include non-braking of the vehicle 120. That is, the vehicle 120 is not actively braking or decelerating. The predetermined conditions may also include changes in the elevation of the vehicle 120 being less than a predetermined elevation change threshold. That is, the vehicle 120 is not experiencing large inclines, declines, or other changes in elevation. The predetermined conditions may also include the speed of the vehicle 120 being greater than a predetermined speed threshold. For example, the speed of the vehicle 120 may be required to be greater than 5 m/s. The predetermined conditions may also include the effective gear of the vehicle 120 being less than a predetermined gear ratio threshold. For example, the effective gear of the vehicle 120 may be required to be less than 1.

Figure 6A:
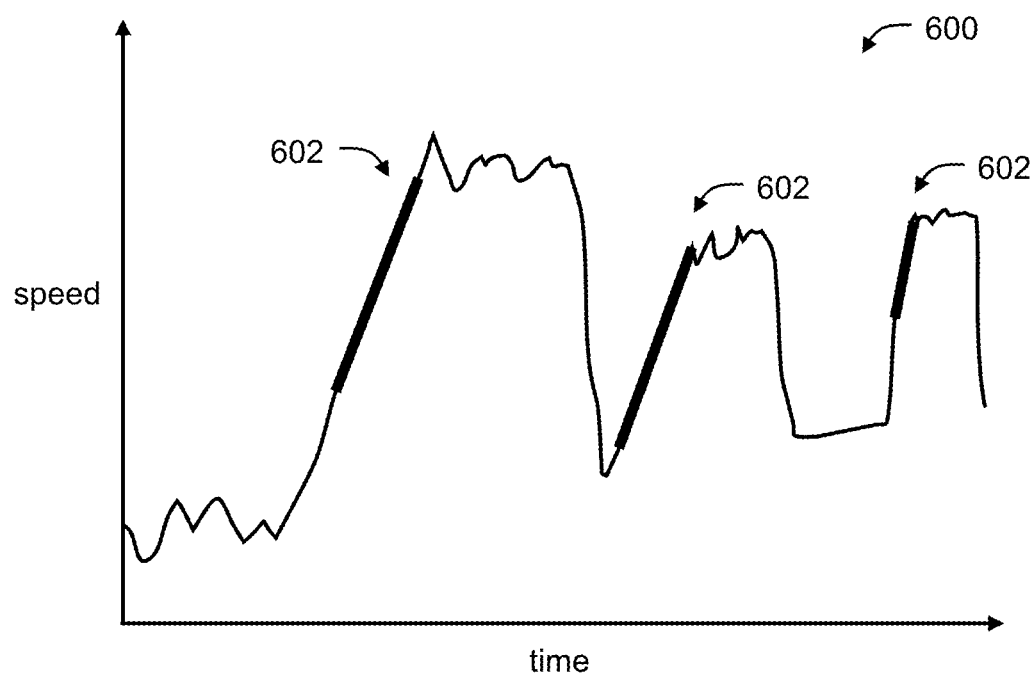
FIG. 6A is a graph of example speed data containing a plurality of example measured speed profiles, in accordance with an embodiment.
Figure 6B:
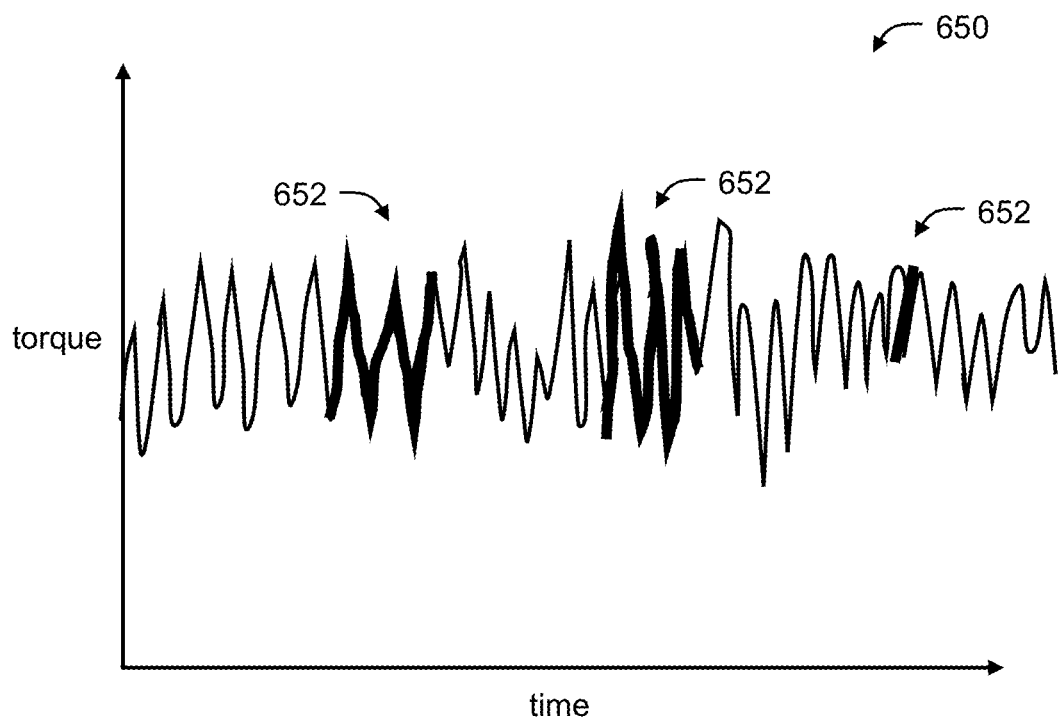
FIG. 6B is a graph of example torque data containing a plurality of example measured torque profiles, in accordance with an embodiment.

Referring now to FIGS. 6A and 6B, there is shown example speed data 600 and torque data 650. As shown, portions of the speed data (i.e., measured speed profiles) 602 and torque data (i.e., measured torque profiles) 652 can be identified as vehicle maneuvers. In the illustrated example, the vehicle maneuvers correspond to portions of the vehicle data when the vehicle 120 was in acceleration (i.e., being actively propelled or driven). As shown, various measured speed profiles 602 and measured torque profiles 652 that satisfy this condition can be identified as vehicle maneuvers.

Referring back to FIG. 4, at 406, a plurality of simulated torque profiles can be generated for each vehicle maneuver. For example, the fleet management system 110 (e.g., processor 112) and/or telematics device 130 (e.g., processor 132) can generate the simulated torque profiles. Each simulated torque profile can be generated using a vehicle dynamics model. The vehicle dynamics model can be any suitable model for simulating the operation of the vehicle 120. For example, the vehicle dynamics model may be a model generated using various modeling/simulation software, such as, but not limited to, MapleSim™, Simulink™, SystemModeler™, Dymola™, and/or SimulationX™. In various embodiments, the vehicle dynamics model can be a FMU (functional mock-up unit) and/or FMI (functional mock-up interface) that can interface with other software.

The vehicle dynamics model can generate the simulated torque profiles based on various input data. The input data can include various vehicle and/or other data. For example, the input data for each vehicle maneuver can include at least some of the portion of the vehicle data 500 associated that vehicle maneuver. For example, the input data can include the measured speed profile associated with the corresponding vehicle maneuver. The input data for each vehicle maneuver can also include a plurality of candidate vehicle weights. Each candidate vehicle weight can represent a presumed or putative weight of the vehicle 120. Each simulated torque profile can correspond to one of the candidate vehicle weights. Accordingly, each simulated torque profile can represent a simulation or prediction of the torque data (i.e., torque profile) that could be measured during the vehicle maneuver if the vehicle 120 weight was the candidate vehicle weight.

Figure 8A:
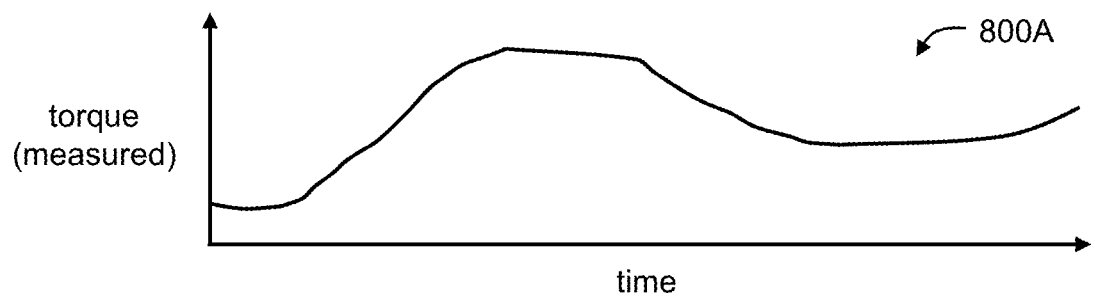
FIG. 8A is a graph of an example measured torque profile, in accordance with an embodiment.
Figure 8B:
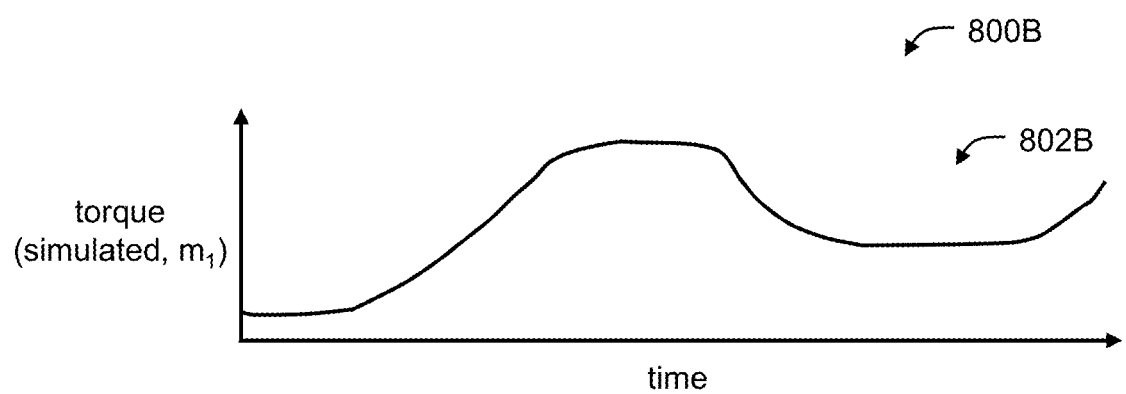
FIG. 8B is a plurality of graphs of a plurality of example simulated torque profiles corresponding to a plurality of example candidate vehicle weights, in accordance with an embodiment.
Figure 8B:
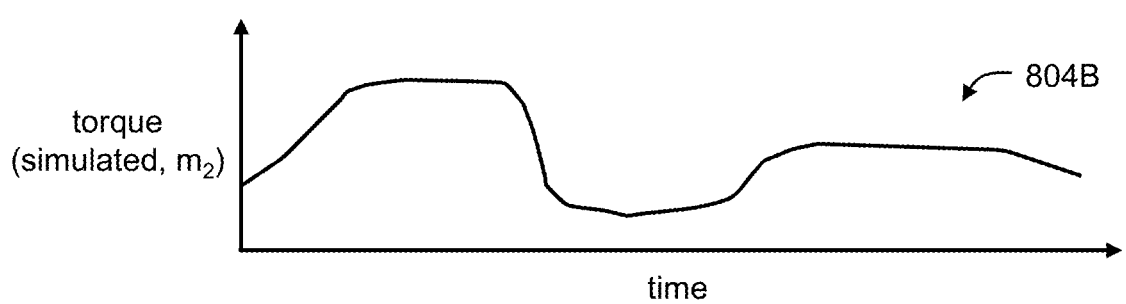
Figure 8B:
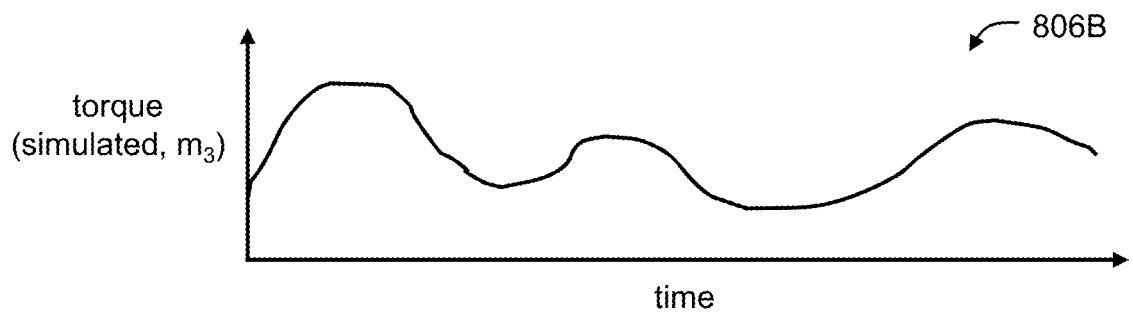

Referring to FIG. 8B, there is shown an example of a plurality of simulated torque profiles 800B. The plurality of simulated torque profiles 800B can correspond to a particular vehicle maneuver. The plurality of simulated torque profiles 800B can also correspond to a plurality of candidate vehicle weights ($m_1$, $m_2$, $m_3$). Each simulated torque profile 800B can correspond to a different one of the candidate vehicle weights. For instance, in the illustrated example, a first simulated torque profile 802B corresponds to a first candidate vehicle weight ($m_1$), a second simulated torque profile 804B corresponds to a second candidate vehicle weight ($m_2$), and a third simulated torque profile 806B corresponds to a third candidate vehicle weight ($m_3$). The simulated torque profiles 800B can represent wheel torque and/or engine torque and may be in units of torque and/or a percentage of maximum torque.

Figure 7:
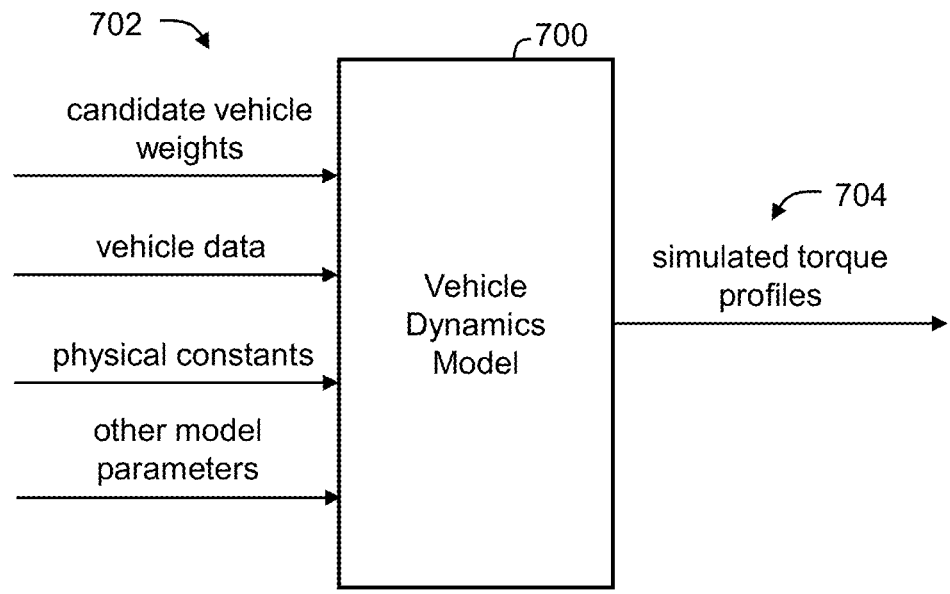
FIG. 7 is a block diagram of an example vehicle dynamics model, in accordance with an embodiment.

Referring now to FIG. 7, there is shown an example vehicle dynamics model 700. As shown, the vehicle dynamics model can receive various input data 702 and generate simulated torque profiles 704 based on the input data 702. In the illustrated example, the input data 702 includes candidate vehicle weights, vehicle data, physical constants, and other model parameters. As described herein, the candidate vehicle weights can represent presumed or putative weights of the vehicle 120. The vehicle data can include various vehicle data associated with the corresponding vehicle maneuvers, such as, but not limited to, measured speed profiles. The physical constants can include various physical coefficients, parameters, and/or constants that can be used by the vehicle dynamics model 700, such as, but not limited to, wheel radii, vehicle cross-sectional dimensions, drag coefficients, roll coefficients, etc. The other model parameters can include auxiliary or secondary parameters that are specific to the vehicle dynamics model 700. For example, the other model parameters may include PID (proportional integral derivative) controller parameters that can be used to adjust the sensitivity of the vehicle dynamics model 700.

Referring back to FIG. 4, at 408, a plurality of error profiles can be generated. For example, the fleet management system 110 (e.g., processor 112) and/or telematics device 130 (e.g., processor 132) can generate the error profiles. An error profile can be generated for each vehicle maneuver based on differences between the plurality of simulated torque profiles and the measured torque profile corresponding to that vehicle maneuver.

Referring to FIGS. 8A and 8B, there is shown an example measured torque profile 800A and an example of a plurality of simulated torque profiles 800B. In the illustrated example, the measured torque profile 800A and simulated torque profiles 800B correspond to the same vehicle maneuver. Accordingly, an error profile can be generated based on differences between the measured torque profile 800A and each of the simulated torque profiles 800B. Since each simulated torque profile 800B corresponds to a different candidate vehicle weight ($m_1$, $m_2$, $m_3$), each error profile can represent the error of each candidate vehicle weight.

Figure 9:
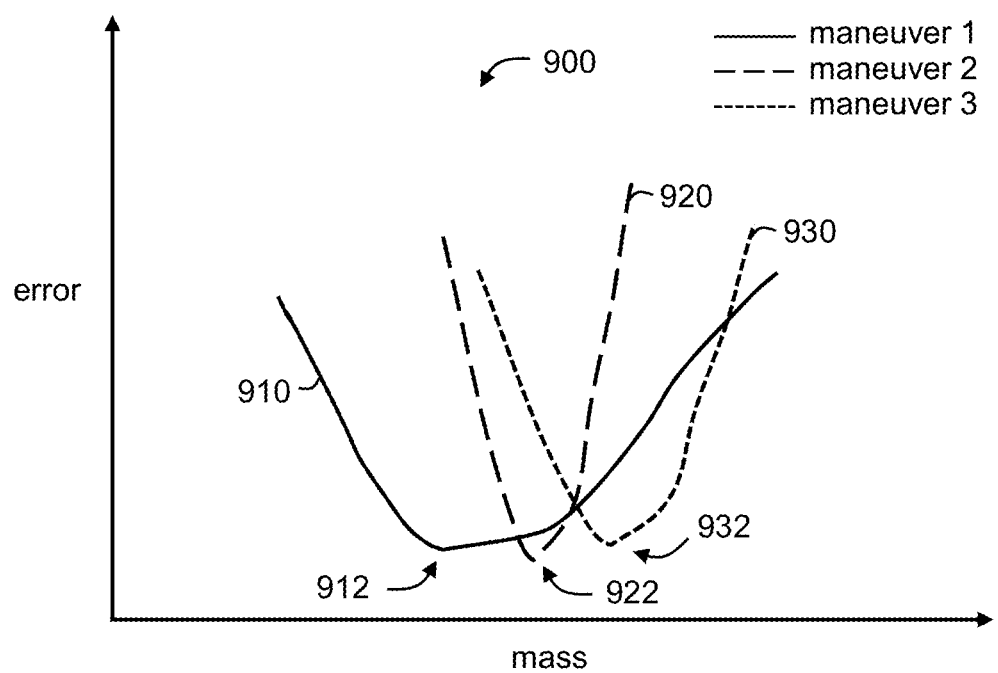
FIG. 9 is a graph of a plurality of example error profiles, in accordance with an embodiment.

Referring to FIG. 9, there is shown a plurality of example error profiles 900. As shown, each error profile can correspond to a particular vehicle maneuver. For instance, in the illustrated example, a first error profile 910 corresponds to a first vehicle maneuver (maneuver 1), a second error profile 920 corresponds to a second vehicle maneuver (maneuver 2), a third error profile 930 corresponds to a third vehicle maneuver (maneuver 3). Each error profile 900 can represent the error between the measured torque profile 800A and the simulated torque profiles 800B for the corresponding vehicle maneuver. Since each simulated torque profile 800B can correspond to a particular candidate vehicle weight, each error profile 900 can represent the error of each candidate vehicle weight for a particular vehicle maneuver.

The differences between the simulated torque profiles 800B and the measured torque profiles 800A can be determined in various ways. In some embodiments, the differences can correspond to differences between the area under the curve of each of the simulated torque profiles 800B and the area under of the curve of the measured torque profile 800A. The differences may be the mean square error of the differences of the respective areas under the curves. An advantage of determining the differences in this manner is that noise and/or other errors in the torque profiles may have less of an effect on the area under the curve as compared to the torque profile itself.

Referring back to FIG. 4, at 410, the estimated weight of the vehicle 120 can be determined based on the plurality of error profiles 900. For example, the fleet management system 110 (e.g., processor 112) and/or telematics device 130 (e.g., processor 132) can determine the estimated weight of the vehicle 120. This may involve minimizing and/or averaging the error profiles 900. For example, referring back to FIG. 9, each error profile 900 can have a minimum that corresponds to a particular candidate vehicle weight. In the illustrated example, the first error profile 910 has a minimum 912, the second error profile 920 has a minimum 922, and the third error profile 930 has a minimum 932. The candidate vehicle weights that minimize the error profiles 900 can be identified and used to determine the estimated weight of the vehicle 120. In the illustrated example, the candidate vehicle weights corresponding to the minimums 912, 922, and 932 can be used to determine the estimated weight of the vehicle 120. Hence, each error profile 900 can represent a grid search for a candidate vehicle weight that minimizes the error between the simulated torque profiles 800B and the measured torque profiles 800A.

In various embodiments, the estimated weight of the vehicle 120 can be determined based on an average of the candidate vehicle weights that minimize the error profiles 910. For instance, in the illustrated example, the candidate vehicle weights corresponding the minimums 912, 922, and 932 can be averaged to determine the estimated weight of the vehicle 120. In some embodiments, the average of the candidate vehicle weights can be a weighted average. The candidate vehicle weights can be assigned different weights based on the corresponding error profile 900. For example, the candidate vehicle weights can be weighted based on a sensitivity of the corresponding error profiles 910. The sensitivity of an error profile 910 can correspond to the slope or rate of change of that error profile 910. An error profile with a greater slope can be considered more sensitive than an error profile having a lower slope because a greater slope can represent a large change in error in response to a small change in candidate vehicle weight. Candidate vehicle weights corresponding to error profiles 910 having greater sensitivity can be given more weight than candidate vehicle weights corresponding to error profiles 910 having lower sensitivity. For example, the candidate vehicle weight identified from error profile 920 may be assigned greater weight than the candidate vehicle weights identified from error profiles 910 and 930.

Subsequent to 410, the estimated weight of the vehicle 120 can be used in various ways. For example, the fuel economy of the vehicle 120 can be determined based on the estimated weight of the vehicle 120. That is, the fleet management system 110 (e.g., processor 112) and/or telematics device 130 (e.g., processor 132) can determine the fuel economy of the vehicle 120.

Additionally, or alternatively, the load state of the vehicle 120 can be determined based on the estimated weight of the vehicle 120. For example, the fleet management system 110 (e.g., processor 112) and/or telematics device 130 (e.g., processor 132) can determine the load state of the vehicle 120. The load state of a vehicle 120 can indicate whether the vehicle 120 is loaded with cargo. The load state of a vehicle 120 may also indicate whether the vehicle 120 is excessively loaded. The load state of a vehicle 120 can be used to determine the utilization rate of the vehicle 120. In various embodiments, the load state of the vehicle 120 can be determined based on a predetermined threshold. For example, the vehicle 120 can be determined to be in a loaded state if the estimated weight of the vehicle 120 satisfies a predetermined vehicle weight threshold. If the estimated weight of the vehicle 120 does not satisfy the predetermined vehicle weight threshold, the vehicle 120 can be determined to be in an unloaded state. In some embodiments, the predetermined vehicle weight threshold may be a first predetermined weight threshold, and the vehicle 120 may be determined to be in an overloaded state if the estimated weight of the vehicle 120 satisfies a second predetermined vehicle weight threshold. The second predetermined weight threshold may be greater than the first predetermined weight threshold.

Figure 10:
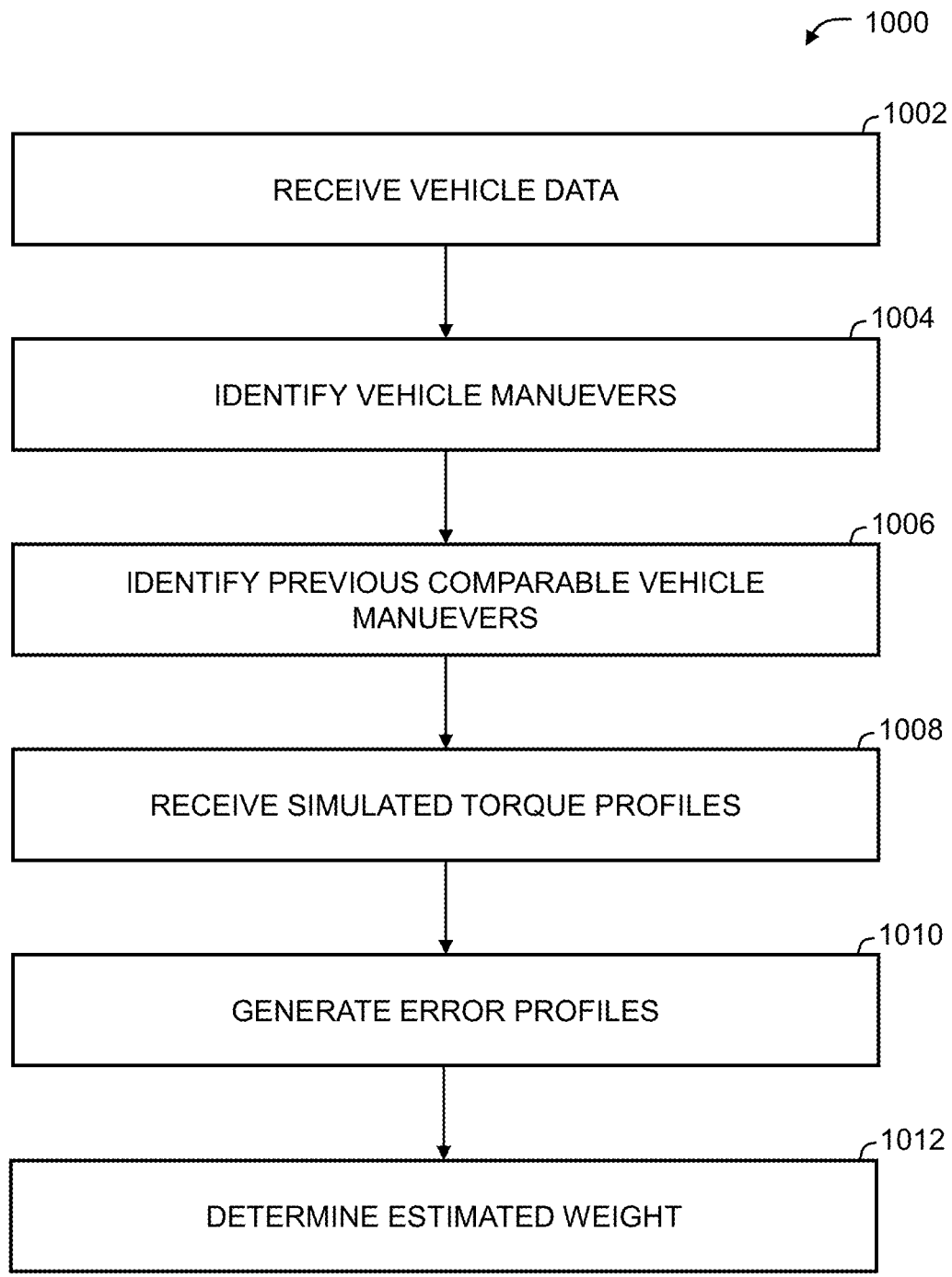
FIG. 10 is a flowchart of an example method for preprocessing vehicle weight estimations, in accordance with an embodiment.

Referring to FIG. 10, there is shown another example method 1000 for determining an estimated weight of a vehicle 120. In contrast with the approach described with reference to FIG. 4, method 1000 can use pre-generated simulated torque profiles. That is, the vehicle dynamics model need not be used during execution of method 1000. An advantage of this approach is the amount of data processing by method 1000 can be reduced. At scale, for example, when estimating the weight of hundreds, thousands, or even millions of vehicles 120, this can significantly improve the efficiency of method 1000.

Like method 400, method 1000 can be implemented by the fleet management system 110, one or more telematics devices 130, or a combination thereof. That is, method 1000 can be implemented by operating at least one processor of the fleet management system 110 and/or one or more telematics devices 130. For example, method 1000 can be implemented by the processor 112 and/or the processor 132 executing instructions stored on the data storage 114 and/or the data storage 134.

At 1002, vehicle data associated with the vehicle 120 can be received. For example, the telematics device 130 may receive vehicle data from the sensor 138 and/or vehicle components 122. Alternatively, or additionally, the fleet management system 110 may receive vehicle data from a telematics device 130. Alternatively, or additionally, the processor 112 and/or processor 132 may receive vehicle data from the data storage 114 and/or data storage 134.

The vehicle data can include a plurality of vehicle parameters collected during operation of the vehicle 120. As described herein, the vehicle data may include any information, parameters, attributes, characteristics, and/or features associated with the vehicles 120. For example, the vehicle data may include speed data 502, torque data 504, gear ratio data 506, rotation data 508, elevation data 510, and/or acceleration data 512. The vehicle data can include various time series of data points, with each data point representing the value of a particular vehicle parameter at a given time. The vehicle data may vary depending on a vehicle dynamics model.

At 1004, a plurality of vehicle maneuvers can be identified based on the vehicle data. For example, the fleet management system 110 (e.g., processor 112) and/or telematics device 130 (e.g., processor 132) can identify the vehicle maneuvers. As described herein, the criteria used to identify the vehicle maneuvers can depend on a vehicle dynamics model. For example, the vehicle maneuvers may be identified by identifying portions of the vehicle data that satisfy one or more predetermined conditions associated with the vehicle dynamics model. The predetermined conditions may be related to underlying assumptions, rules, and/or requirements of the vehicle dynamics model.

Each vehicle maneuver can be associated with a portion of the vehicle data. For example, a vehicle maneuver may be associated with a portion of the speed data 502, torque data 504, gear ratio data 506, rotation data 508, elevation data 510, and/or acceleration data 512. As described herein, a portion of the vehicle data 500 corresponding to a vehicle maneuver can be referred to as a profile. For example, a portion of the speed data 502 associated with a vehicle maneuver may be referred to as a measured speed profile. Similarly, a portion of the torque data 504 associated with a vehicle maneuver may be referred to as a measured torque profile. In various embodiments, each vehicle maneuver may be associated with a portion of the vehicle data 500 that includes a measured torque profile.

Each vehicle maneuver can be associated with a portion of the vehicle data that includes an identifying profile. The identifying profile can include any type or combinations of types of vehicle data. For example, the identifying profile may include an acceleration profile containing acceleration data 512. As another example, the identifying profile may include an elevation profile containing elevation data 510. As a further example, the identifying profile may include a normalized concatenation of an acceleration profile and an elevation profile. The identifying profile can be used to identify other vehicle maneuvers that are comparable or similar to the vehicle maneuver.

At 1006, a plurality of previous comparable vehicle maneuvers can be identified. For example, the fleet management system 110 (e.g., processor 112) and/or telematics device 130 (e.g., processor 132) can identify the plurality of previous comparable vehicle maneuvers. A previous comparable vehicle maneuver can be identified for each vehicle maneuver.

The previous comparable vehicle maneuvers can be identified by comparing each identifying profile with a plurality of previous representative identifying profiles associated with a plurality of previous representative vehicle maneuvers. The previous representative identifying profiles can include the same type or types of vehicle data as the identifying profiles. For example, the previous representative identifying profiles may include previous representative elevation profiles. As another example, the previous representative identifying profiles may include previous representative elevation profiles. As a further example, the previous representative identifying profiles may include normalized concatenations of previous representative acceleration profiles and previous representative elevation profiles.

The identifying profiles can be compared in various ways. In some cases, the identifying profiles can be compared by determining a similarity score between the identifying profile and each previous representative identifying profile. For example, a dynamic time warping algorithm can be used to determine a cumulative distance between the identifying profile and each previous representative identifying profile.

Figure 12A:
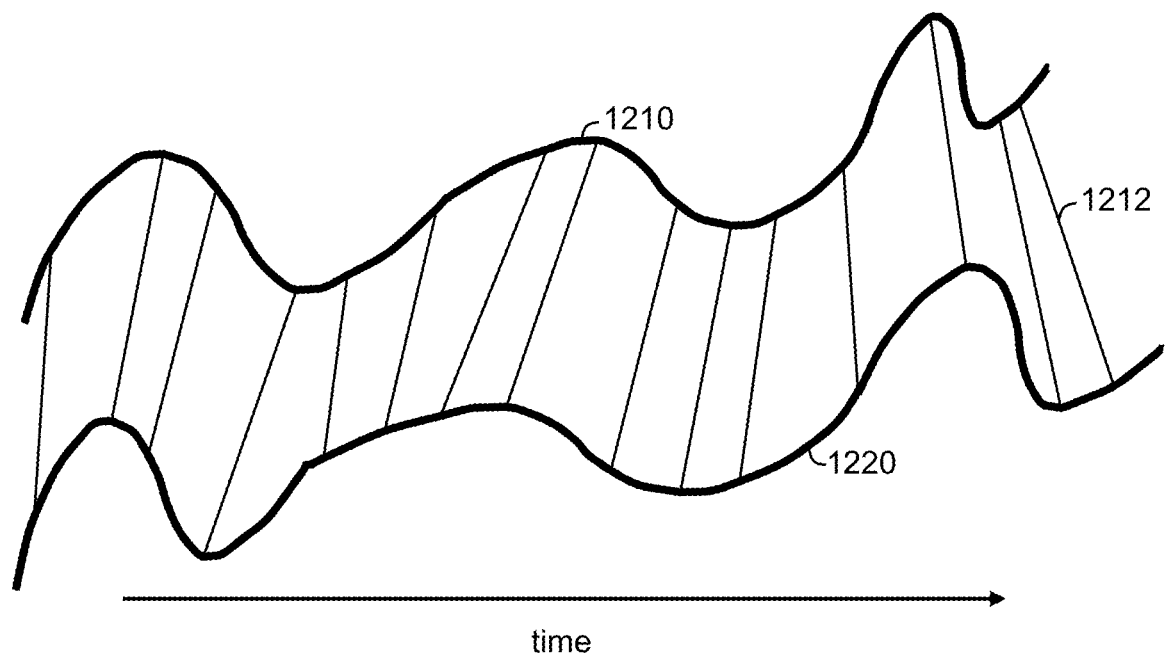
FIGS. 12A and 12B are graphs illustrating an example implementation of a dynamic time warping algorithm.
Figure 12B:
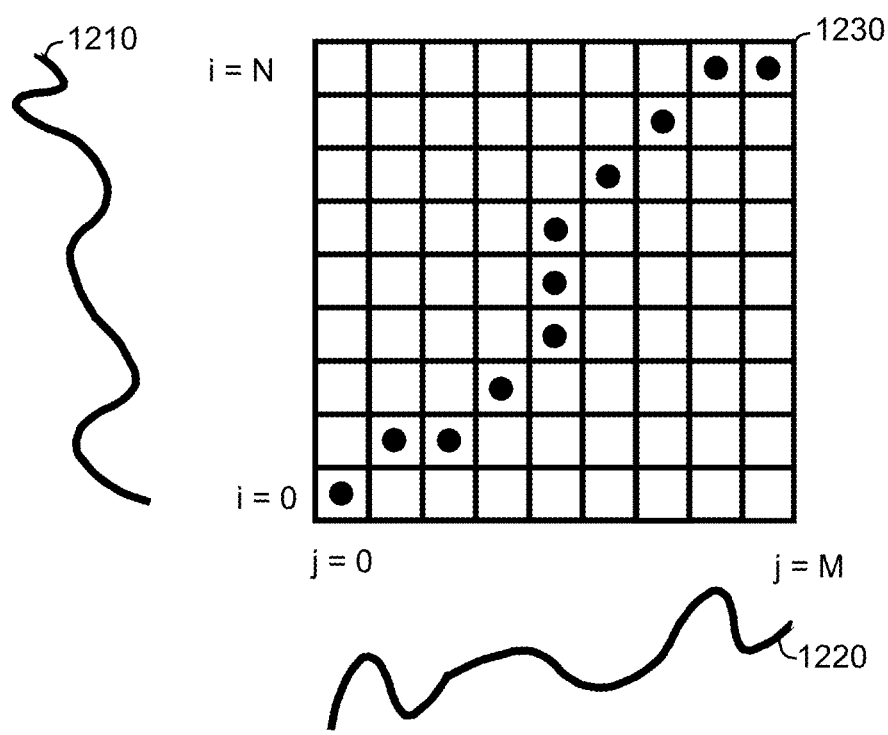

Referring now to FIGS. 12A and 12B, there is shown an example implementation of a dynamic time warping algorithm. In the illustrated example, there are two time series or temporal sequences 1210, 1220 having varying speeds. As shown, dynamic time warping can be used to measure a similarity between the first and second time series 1210, 1220. More specifically, dynamic time warping can be used to compute local stretches or compressions 1212 to apply to the time axis of the first time series 1210 to optimally match the second time series 1220. This can form a cumulative distance that can represent the similarity between the time series 1210, 1220.

As shown, dynamic time warping can be implemented using a cost matrix 1230. The cost matrix 1230 can be an (N+1)×(M+1) matrix, where N is the number of data points in the first time series 1210 and M is the number of data points in the second time series 1220. The cost matrix 1230 can be initialized by setting elements i=1 to N, j=0 and i=0, j=1 to M to infinity, and element i=0, j=0 to zero. The remaining elements in the cost matrix (i.e., i=1 to N, j=1 to M) can be determined by the following equation:

$$d(x_i, y_j) + \min \begin{cases} D_{i-1,j-1} \\ D_{i-1,j} \\ D_{i,j-1} \end{cases}$$

where x is the first time series 1210, y is the second time series 1220, D is the cost matrix 1230, and $d(x_i, y_j)=|x_i-y_j|$ The optimal alignment of the time series 1210, 1220 can be determined by tracing back the path from element i=N, j=M to element i=0, j=0. Each element can trace back to another element based on the previous element $D_{i-1,j-1}$ (match), $D_{i-1,j}$ (insertion), or $D_{i,j-1}$ (deletion) that was used to calculate the current element.

Although dynamic time warping may be used to determine similarity between identifying profiles, it should be appreciated that various other matching algorithms or models can also be used. In some cases, machine learning and other techniques may be used to match the identifying profiles of the vehicle maneuvers to the previous representative identifying profiles of previous representative vehicle maneuvers.

Referring back to FIG. 10, at 1008, a plurality of simulated torque profiles for each previous comparable vehicle maneuver can be received. For example, the fleet management system 110 (e.g., processor 112) and/or telematics device 130 (e.g., processor 132) can receive each plurality of simulated torque profiles (e.g., from data storage 114 and/or data storage 134). Each plurality of simulated torque profiles can have been previously generated using a vehicle dynamics model, as described herein. In this manner, the vehicle dynamics model need not be used during the execution of method 1000. This can greatly reduce the amount of data processing required when performing weight estimations for large numbers of vehicles 120.

At 1010, a plurality of error profiles can be generated. For example, the fleet management system 110 (e.g., processor 112) and/or telematics device 130 (e.g., processor 132) can generate the error profiles. As descried herein, an error profile can be generated for each vehicle maneuver based on differences between the plurality of simulated torque profiles and the measured torque profile corresponding to that vehicle maneuver. For example, the differences may correspond to differences between the area under the curve of each of the simulated torque profiles and the area under of the curve of the measured torque profile. In some cases, the differences may be the mean square error of the differences of the respective areas under the curves.

At 1012, the estimated weight of the vehicle 120 can be determined based on the plurality of error profiles. The estimated weight of the vehicle 120 can be determined by minimizing the plurality of error profiles. For example, the fleet management system 110 (e.g., processor 112) and/or telematics device 130 (e.g., processor 132) can determine the estimated weight of the vehicle 120. As described herein, this may involve minimizing and/or averaging the error profiles. For example, the estimated weight of the vehicle 120 can be determined based on an average of the candidate vehicle weights that minimize the error profiles. As described herein, the candidate vehicle weights can be assigned different weights based on the corresponding error profile. For example, the candidate vehicle weights can be weighted based on a sensitivity of the corresponding error profiles. The sensitivity of an error profile can correspond to the slope or rate of change of that error profile.

Figure 11:
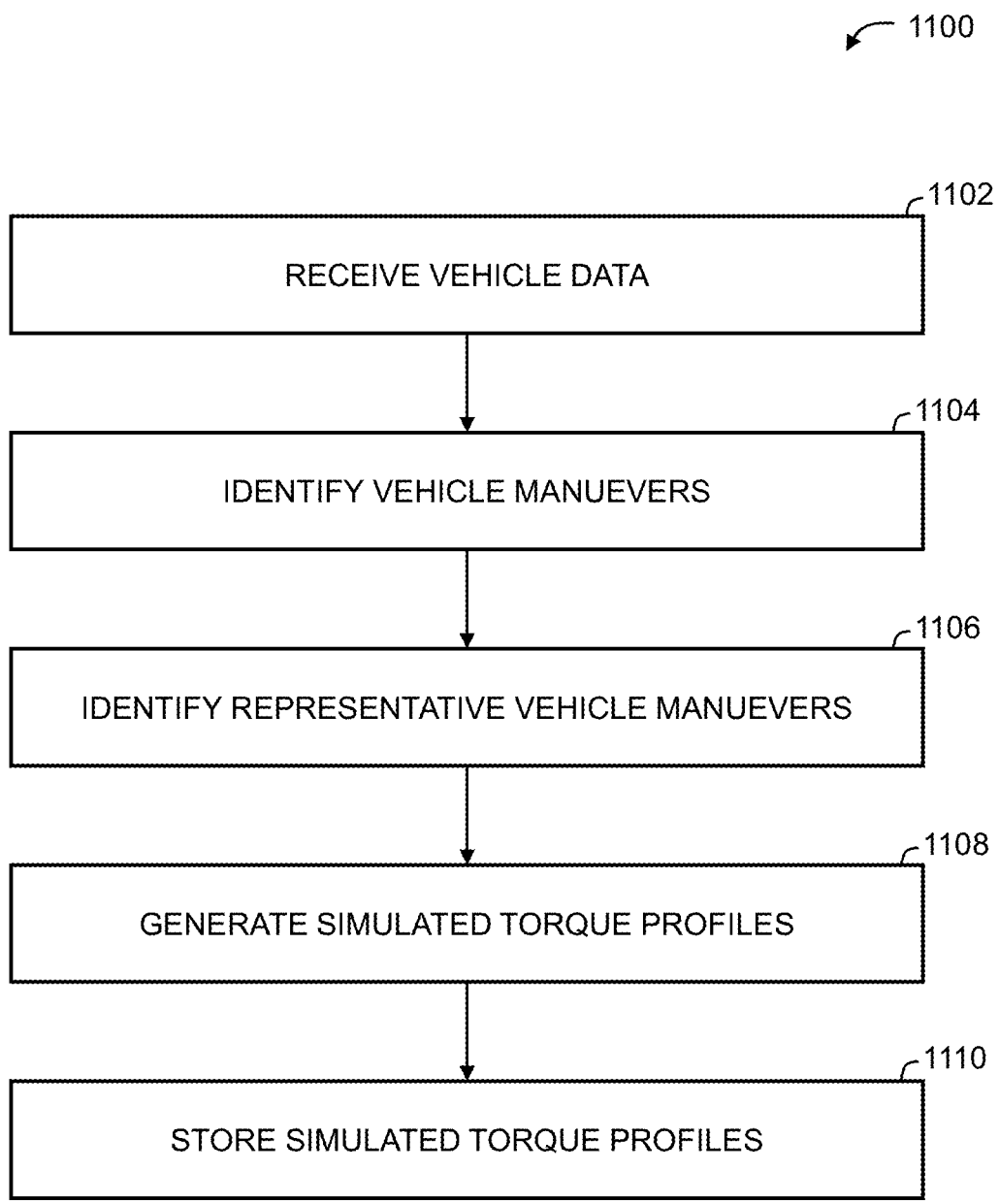
FIG. 11 is a flowchart of another example method for determining an estimated weight of a vehicle, in accordance with an embodiment.

Referring to FIG. 11, there is shown an example method 1100 for preprocessing vehicle weight estimations. Method 1100 can be used to pre-generate the simulated torque profiles used in method 1000. In this manner, the vehicle dynamics model need not be used during execution of method 1000. An advantage of this approach is the amount of data processing during execution of method 1000 can be reduced. At scale, for example, when estimating the weight of hundreds, thousands, or even millions of vehicles 120, this can significantly improve the efficiency of method 1000.

Like methods 400 and 1000, method 1100 can be implemented by the fleet management system 110, one or more telematics devices 130, or a combination thereof. That is, method 1100 can be implemented by operating at least one processor 112 of the fleet management system 110 and/or one or more telematics devices 130. For example, method 1100 can be implemented by the processor 112 and/or the processor 132 executing instructions stored on the data storage 114 and/or the data storage 134.

At 1102, vehicle data associated with a plurality of vehicles 120 can be received. For example, a plurality of telematics devices 130 may receive vehicle data from sensors 138 and/or vehicle components 122. Alternatively, or additionally, the fleet management system 110 may receive vehicle data from a plurality of telematics devices 130. Alternatively, or additionally, the processor 112 and/or processor 132 may receive vehicle data from the data storage 114 and/or data storage 134.

The vehicle data can include a plurality of vehicle parameters collected during operation of the vehicles 120. As described herein, the vehicle data may include any information, parameters, attributes, characteristics, and/or features associated with the vehicles 120. For example, the vehicle data may include speed data 502, torque data 504, gear ratio data 506, rotation data 508, elevation data 510, and/or acceleration data 512. The vehicle data can include various time series of data points, with each data point representing the value of a particular vehicle parameter at a given time. The vehicle data may vary depending on the vehicle dynamics model.

At 1104, a plurality of vehicle maneuvers can be identified based on the vehicle data. For example, the fleet management system 110 (e.g., processor 112) and/or telematics device 130 (e.g., processor 132) can identify the vehicle maneuvers. As described herein, the criteria used to identify the vehicle maneuvers can depend on the vehicle dynamics model used by method 1100. For example, the vehicle maneuvers may be identified by identifying portions of the vehicle data that satisfy one or more predetermined conditions associated with the vehicle dynamics model. The predetermined conditions may be related to underlying assumptions, rules, and/or requirements of the vehicle dynamics model.

Each vehicle maneuver can be associated with a portion of the vehicle data. For example, a vehicle maneuver may be associated with a portion of the speed data 502, torque data 504, gear ratio data 506, rotation data 508, elevation data 510, and/or acceleration data 512. As described herein, a portion of the vehicle data 500 corresponding to a vehicle maneuver can be referred to as a profile. For example, a portion of the speed data 502 associated with a vehicle maneuver may be referred to as a measured speed profile. Similarly, a portion of the torque data 504 associated with a vehicle maneuver may be referred to as a measured torque profile. In some embodiments, each vehicle maneuver may be associated with a portion of the vehicle data 500 that includes a measured speed profile.

Each vehicle maneuver can be associated with a portion of the vehicle data that includes an identifying profile. As described herein, the identifying profile can include any type or combinations of types of vehicle data. For example, the identifying profile may include an acceleration profile containing acceleration data 512. As another example, the identifying profile may include an elevation profile containing elevation data 510. As a further example, the identifying profile may include a normalized concatenation of an acceleration profile and an elevation profile. The identifying profile can be used to identify other vehicle maneuvers that are comparable or similar to the vehicle maneuver.

At 1106, a plurality of representative vehicle maneuvers can be identified based on the identifying profile associated with each vehicle maneuver. For example, the fleet management system 110 (e.g., processor 112) and/or telematics device 130 (e.g., processor 132) can identify the representative vehicle maneuvers.

The plurality of representative vehicle maneuvers can be identified by comparing each identifying profile with each other identifying profile. In this manner vehicle maneuvers that are sufficiently similar to each other (i.e., have similar identifying profiles) can be simplified to a single representative vehicle maneuver. This can greatly reduce the number of simulated torque profiles that are generated by the vehicle dynamics model. As a result, the number of comparisons executed when identifying previous comparable vehicle maneuvers in method 1000 can also be reduced.

The identifying profiles can be compared in various ways. In some cases, the identifying profiles can be compared by determining a similarity score between each identifying profile and eliminating at least some of the vehicle maneuvers from being identified as representative vehicle maneuvers based on the similarity scores. As described herein, a dynamic time warping algorithm can be used to determine the similarity scores by determining a cumulative distance between each identifying profile.

At 1108, a plurality of simulated torque profiles can be generated for each representative vehicle maneuver. For example, the fleet management system 110 (e.g., processor 112) and/or telematics device 130 (e.g., processor 132) can generate the simulated torque profiles. r dynamics model may be a model generated using various modeling/simulation software, such as, but not limited to, MapleSim™, Simulink™, SystemModeler™, Dymola™, and/or SimulationX™. In various embodiments, the vehicle dynamics model can be a FMU (functional mock-up unit) and/or FMI (functional mock-up interface) that can interface with other software.

The vehicle dynamics model can generate the simulated torque profiles based on various input data. The input data can include various vehicle and/or other data. For example, the input data for each representative vehicle maneuver can include at least some of the portion of the vehicle data 500 associated that representative vehicle maneuver. For example, the input data can include the measured speed profile associated with the corresponding representative vehicle maneuver. The input data for each vehicle maneuver can also include a plurality of candidate vehicle weights. Each candidate vehicle weight can represent a presumed or putative weight of the vehicle 120. Each simulated torque profile can correspond to one of the candidate vehicle weights. Accordingly, each simulated torque profile can represent a simulation or prediction of the torque data (i.e., torque profile) that could be measured during the vehicle maneuver if the vehicle 120 weight was the candidate vehicle weight.

At 1110, each plurality of simulated torque profiles can be stored in association with the identifying profile for each representative vehicle maneuver. For example, the fleet management system 110 (e.g., processor 112) and/or telematics device 130 (e.g., processor 132) can store each plurality of simulated torque profiles in data storage 134 and/or data storage 114. In this manner, the simulated torque profiles can be available without further use of the vehicle dynamics model, for example, by matching a vehicle maneuver to one of the representative maneuvers using method 1000. This can greatly reduce the amount of data processing required to perform weight estimations for large numbers of vehicles 120.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device. Furthermore, the term "coupled" may indicate that two elements can be directly coupled to one another or coupled to one another through one or more intermediate elements.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Furthermore, any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). Programmable hardware such as FPGA can also be used as standalone or in combination with other devices. These devices may also have at least one input device (e.g., a pushbutton keyboard, mouse, a touchscreen, and the like), and at least one output device (e.g., a display screen, a printer, a wireless radio, and the like) depending on the nature of the device. The devices may also have at least one communication device (e.g., a network interface).

It should also be noted that there may be some elements that are used to implement at least part of one of the embodiments described herein that may be implemented via software that is written in a high-level computer programming language such as object-oriented programming. Accordingly, the program code may be written in C, C++ or any other suitable programming language and may comprise modules or classes, as is known to those skilled in object-oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

The invention claimed is:

1. A method for determining an estimated weight of a vehicle, the method comprising operating at least one processor to:
   receive first vehicle data associated with a plurality of vehicles, the first vehicle data comprising a first plurality of vehicle parameters collected during operation of the plurality of vehicles;
   identify a plurality of representative vehicle maneuvers based on the first vehicle data, each representative vehicle maneuver being associated with a portion of the first vehicle data;
   generate a plurality of simulated torque profiles for each representative vehicle maneuver, each simulated torque profile being generated using a vehicle dynamics model based on at least some of the portion of the first vehicle data associated with the corresponding representative vehicle maneuver;
   receive second vehicle data associated with the vehicle, the vehicle data comprising a second plurality of vehicle parameters collected during operation of the vehicle;
   identify a plurality of vehicle maneuvers based on the second vehicle data, each vehicle maneuver being associated with a portion of the second vehicle data, each portion of the second vehicle data comprising a measured torque profile;
   identify a representative vehicle maneuver for each vehicle maneuver;
   generate a plurality of error profiles, an error profile being generated for each vehicle maneuver based on differences between the plurality of simulated torque profiles corresponding to the respective representative vehicle maneuver and the measured torque profile corresponding to the respective vehicle maneuver; and
   determine the estimated weight of the vehicle by minimizing the plurality of error profiles.

2. The method of claim 1, wherein
   each portion of the second vehicle data associated with one of the plurality of vehicle maneuvers comprises an identifying profile; and identifying the representative vehicle maneuver for each vehicle maneuver comprises:
comparing the identifying profile associated with the vehicle maneuver with a plurality of representative identifying profiles associated with the plurality of representative vehicle maneuvers.

3. The method of claim 2 wherein the identifying profile comprises an acceleration profile and the plurality of representative identifying profiles comprises a plurality of representative acceleration profiles.

4. The method of claim 2 wherein the identifying profile comprises an elevation profile and the plurality of representative identifying profiles comprises a plurality of representative elevation profiles.

5. The method of claim 2, wherein comparing the identifying profile with the plurality of representative identifying profiles comprises:
determining a similarity score between the identifying profile and each representative identifying profile.

6. The method of claim 5, wherein determining the similarity score between the identifying profile and each representative identifying profile comprises using a dynamic time warping algorithm to determine a cumulative distance between the identifying profile and each representative identifying profile.

7. The method of claim 1, wherein determining the estimated weight of the vehicle comprises identifying a plurality of candidate vehicle weights, a candidate vehicle weight being identified for each error profile, each candidate vehicle weight minimizing the corresponding error profile.

8. The method of claim 7, wherein determining the estimated weight of the vehicle comprises determining the estimated weight of the vehicle based on an average of the identified candidate vehicle weights that minimize the corresponding error profiles.

9. The method of claim 8, wherein:
the average of the identified candidate vehicle weights is a weighted average; and
the identified candidate vehicle weights are weighted based on a sensitivity of the corresponding error profiles.

10. The method of claim 1, wherein identifying the plurality of vehicle maneuvers comprises:
identifying portions of the first vehicle data that meet at least one predetermined vehicle condition associated with the vehicle dynamics model.

11. A system for determining an estimated weight of a vehicle, the system comprising:
at least one data storage configured to store first and second vehicle data, the first vehicle data associated with a plurality of vehicles, the first vehicle data comprising a first plurality of vehicle parameters collected during operation of the plurality of vehicles, the second vehicle data associated with the vehicle, the vehicle data comprising a plurality of second vehicle parameters collected during operation of the vehicle; and
at least one processor in communication with the at least one data storage, the at least one processor configured to:
identify a plurality of representative vehicle maneuvers based on the first vehicle data, each representative vehicle maneuver being associated with a portion of the first vehicle data;
generate a plurality of simulated torque profiles for each representative vehicle maneuver, each simulated torque profile being generated using a vehicle dynamics model based on at least some of the portion of the first vehicle data associated with the corresponding representative vehicle maneuver;
identify a plurality of vehicle maneuvers based on the second vehicle data, each vehicle maneuver being associated with a portion of the second vehicle data, each portion of the second vehicle data comprising a measured torque profile;
identify a representative vehicle maneuver for each vehicle maneuver;
generate a plurality of error profiles, an error profile being generated for each vehicle maneuver based on differences between the plurality of simulated torque profiles corresponding to the respective representative vehicle maneuver and the measured torque profile corresponding to the respective vehicle maneuver; and
determine the estimated weight of the vehicle by minimizing the plurality of error profiles.

12. The system of claim 11, wherein
each portion of the second vehicle data associated with one of the plurality of vehicle maneuvers comprises an identifying profile; and
identifying the representative vehicle maneuver for each vehicle maneuver comprises:
comparing the identifying profile associated with the vehicle maneuver with a plurality of representative profiles associated with the plurality of representative vehicle maneuvers.

13. The system of claim 12, wherein comparing the identifying profile with the plurality of previous representative identifying profiles comprises:
determining a similarity score between the identifying profile and each representative identifying profile.

14. The system of claim 13, wherein determining the similarity score between the identifying profile and each representative identifying profile comprises using a dynamic time warping algorithm to determine a cumulative distance between the identifying profile and each representative identifying profile.

15. The system of claim 12, wherein the identifying profile comprises an acceleration profile and the plurality of representative identifying profiles comprises a plurality of representative acceleration profiles.

16. The system of claim 12, wherein the identifying profile comprises an elevation profile and the plurality of representative identifying profiles comprises a plurality of representative elevation profiles.

17. The system of claim 11, wherein determining the estimated weight of the vehicle comprises identifying a plurality of candidate vehicle weights, a candidate vehicle weight being identified for each error profile, each candidate vehicle weight minimizing the corresponding error profile.

18. The system of claim 17, wherein determining the estimated weight of the vehicle comprises determining the estimated weight of the vehicle based on an average of the identified candidate vehicle weights that minimize the corresponding error profiles.

19. The system of claim 18, wherein:
the average of the identified candidate vehicle weights is a weighted average; and
the identified candidate vehicle weights are weighted based on a sensitivity of the corresponding error profiles.

20. The system of claim 11, wherein identifying the plurality of vehicle maneuvers comprises:

identifying portions of the first vehicle data that meet at least one predetermined vehicle condition associated with the vehicle dynamics model.

21. A non-transitory computer readable medium having instructions stored thereon executable by at least one processor to implement a method for determining an estimated weight of a vehicle, the method comprising operating the at least one processor to:
   receive first vehicle data associated with a plurality of vehicles, the first vehicle data comprising a first plurality of vehicle parameters collected during operation of the plurality of vehicles;
   identify a plurality of representative vehicle maneuvers based on the first vehicle data, each representative vehicle maneuver being associated with a portion of the first vehicle data;
   generate a plurality of simulated torque profiles for each representative vehicle maneuver, each simulated torque profile being generated using a vehicle dynamics model based on at least some of the portion of the first vehicle data associated with the corresponding representative vehicle maneuver;
   receive second vehicle data associated with the vehicle, the vehicle data comprising a plurality of second vehicle parameters collected during operation of the vehicle;
   identify a plurality of vehicle maneuvers based on the second vehicle data, each vehicle maneuver being associated with a portion of the second vehicle data, each portion of the second vehicle data comprising a measured torque profile;
   identify a representative vehicle maneuver for each vehicle maneuver;
   generate a plurality of error profiles, an error profile being generated for each vehicle maneuver based on differences between the plurality of simulated torque profiles corresponding to the respective representative vehicle maneuver and the measured torque profile corresponding to the respective vehicle maneuver; and
   determine the estimated weight of the vehicle by minimizing the plurality of error profiles.

* * * * *